(12) United States Patent
Chen et al.

(10) Patent No.: US 11,023,697 B2
(45) Date of Patent: Jun. 1, 2021

(54) OBJECT STORING APPARATUS AND OBJECT ACCESS METHOD

(71) Applicants: Kai-Yi Chen, Taipei (TW); Pin-Yu Chou, Taipei (TW); Sheng-Chieh Tang, Taipei (TW); Che-Wei Liang, Taipei (TW); Chia-Shin Weng, Taipei (TW); Wei-Jun Wang, Taipei (TW); Wen-Yi Chiu, Taipei (TW)

(72) Inventors: Kai-Yi Chen, Taipei (TW); Pin-Yu Chou, Taipei (TW); Sheng-Chieh Tang, Taipei (TW); Che-Wei Liang, Taipei (TW); Chia-Shin Weng, Taipei (TW); Wei-Jun Wang, Taipei (TW); Wen-Yi Chiu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 141 days.

(21) Appl. No.: 16/393,975

(22) Filed: Apr. 25, 2019

(65) Prior Publication Data
US 2020/0234016 A1    Jul. 23, 2020

(30) Foreign Application Priority Data
Jan. 17, 2019   (TW) .............................. 10810178.5

(51) Int. Cl.
*G06K 7/10*         (2006.01)
*G06F 3/041*        (2006.01)
(Continued)

(52) U.S. Cl.
CPC .......... *G06K 7/10722* (2013.01); *A47F 3/001* (2013.01); *A47F 10/02* (2013.01);
(Continued)

(58) Field of Classification Search
CPC .... A47F 10/02; G06F 3/0414; G06K 7/10722
(Continued)

(56) References Cited

U.S. PATENT DOCUMENTS

| | | | |
|---|---|---|---|
| 2011/0010275 A1* | 1/2011 | Hull | G06Q 10/087 705/28 |
| 2014/0320647 A1* | 10/2014 | Seo | F25D 29/00 348/143 |
| 2020/0065748 A1* | 2/2020 | Durkee | G06K 7/1408 |

FOREIGN PATENT DOCUMENTS

| | | |
|---|---|---|
| CN | 1875813 | 12/2006 |
| CN | 2914819 | 6/2007 |

(Continued)

OTHER PUBLICATIONS

"Office Action of Taiwan Counterpart Application," dated Dec. 11, 2019, p. 1-p. 23.

*Primary Examiner* — Toan C Ly
(74) *Attorney, Agent, or Firm* — JCIPRNET

(57) ABSTRACT

The present invention provides an object storing apparatus, an object access method, an object obtaining service method, and an object indication method thereof. The object storing apparatus includes a cabinet body and a cabinet door, and storing positions are disposed inside the cabinet body. The object access method includes the following steps. Whether the cabinet door is opened is determined. In response to the cabinet door being opened, whether a scanning operation for a first external object is activated is determined. The first external object being not an existing external object at a storing position. In response to the scanning operation being activated, object storing is determined. In response to the existing external object being moved, object obtaining is determined. Accordingly, an automatic and convenient storing function can be provided.

18 Claims, 25 Drawing Sheets

(51) Int. Cl.
*A47F 10/02* (2006.01)
*G06K 7/14* (2006.01)
*A47F 3/00* (2006.01)

(52) U.S. Cl.
CPC ......... *G06F 3/0414* (2013.01); *G06K 7/1413* (2013.01); *A47F 2010/025* (2013.01)

(58) Field of Classification Search
USPC .................................................. 235/462.41
See application file for complete search history.

(56) References Cited

FOREIGN PATENT DOCUMENTS

| | | |
|---|---|---|
| CN | 101046832 | 10/2007 |
| CN | 102479287 | 5/2012 |
| CN | 202547269 | 11/2012 |
| CN | 103565172 | 2/2014 |
| CN | 104486975 | 4/2015 |
| CN | 104880021 | 9/2015 |
| CN | 103822434 | 1/2016 |
| CN | 105310360 | 2/2016 |
| CN | 105698469 | 6/2016 |
| CN | 206238815 | 6/2017 |

\* cited by examiner

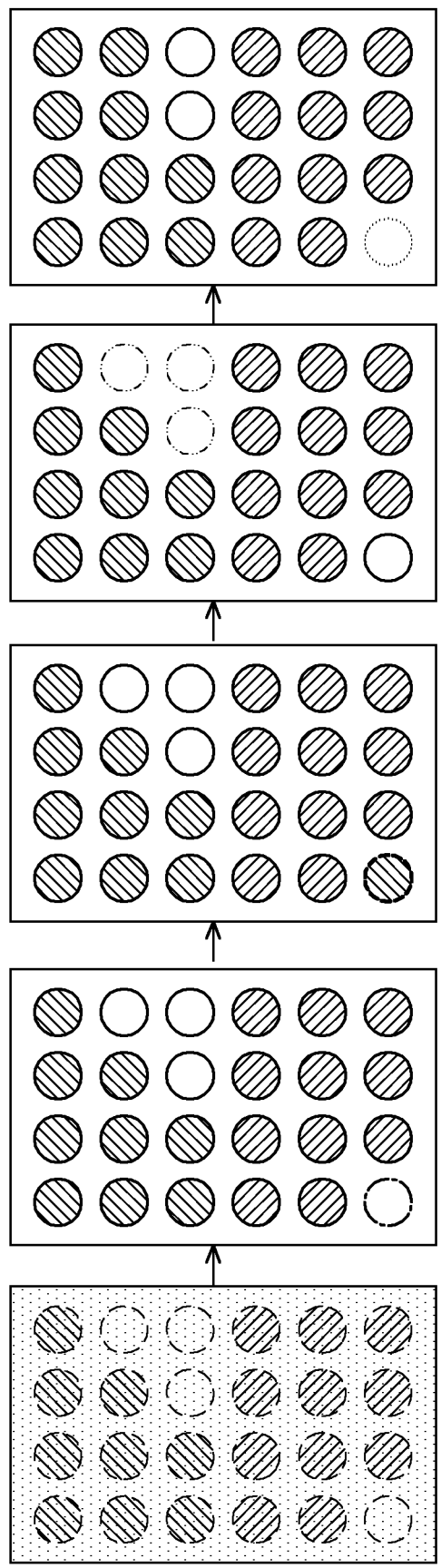

OBJECT STORING APPARATUS AND OBJECT ACCESS METHOD

CROSS-REFERENCE TO RELATED APPLICATION

This application claims the priority benefit of Taiwan application serial no. 108101785, filed on Jan. 17, 2019. The entirety of the above-mentioned patent application is hereby incorporated by reference herein and made a part of this specification.

BACKGROUND OF THE INVENTION

1. Field of the Invention

The present invention relates to an object access method, in particular, to an object storing apparatus, an object access method, an object obtaining service method, and an object indication method thereof.

2. Description of Related Art

People may store related objects for work, life, or interest needs. These objects may be stored in storage cabinets (e.g., lockers, wine coolers, model display cabinets, etc.) for ease of access. However, traditional storage cabinets simply provide space for object placement. It can be seen that there is a need to propose innovative functions and breakthrough changes to existing storage cabinets.

SUMMARY OF THE INVENTION

The present invention provides an object storing apparatus, an object access method, an object obtaining service method, and an object indication method thereof, which are convenient for a user to store and obtain an object and can provide different services correspondingly.

The object storing apparatus of the present invention includes a cabinet body, a cabinet door, storage elements, a scanning apparatus, a cabinet door detector, and a processor. The cabinet body has an internal space. The cabinet door is movably disposed on the cabinet body, and adapted to open or close the internal space. The storage elements are disposed in the internal space, and adapted to store an external object. The scanning apparatus is disposed in the internal space, and adapted to scan the external object. The cabinet door detector determines that the cabinet door is opened or closed. The processor is coupled to the scanning apparatus and the cabinet door detector, and controls the scanning apparatus to activate a scanning operation according to a detection result of the cabinet door detector.

In one embodiment of the present invention, the object storing apparatus further includes a scanning illumination apparatus. The scanning illumination apparatus is coupled to the processor, disposed in the internal space, and adapted to illuminate a scanning area of the scanning apparatus.

In one embodiment of the present invention, when the cabinet door detector detects that the cabinet door is opened, the processor controls the scanning illumination apparatus to illuminate the scanning area of the scanning apparatus with a first brightness.

In one embodiment of the present invention, the object storing apparatus further includes a scanned object detector. The scanned object detector is coupled to the processor, disposed in the internal space, and adapted to detect the external object.

In one embodiment of the present invention, when the scanned object detector detects the external object, the processor controls the scanning illumination apparatus to illuminate the scanning area of the scanning apparatus with a second brightness.

In one embodiment of the present invention, the second brightness is greater than the first brightness.

In one embodiment of the present invention, when the scanning illumination apparatus provides illumination of the second brightness, the processor controls the scanning apparatus to activate a scanning operation.

In one embodiment of the present invention, the object storing apparatus further includes stored object detectors. The stored object detectors are coupled to the processor, disposed in the internal space in respective correspondence with the storage elements, and adapted to detect whether the external objects are stored by the corresponding storage elements.

In one embodiment of the present invention, the object storing apparatus further includes indication illumination apparatuses. The indication illumination apparatuses are coupled to the processor, and disposed in the internal space in respective correspondence with the storage elements.

In one embodiment of the present invention, when the scanning operation is activated and the stored object detectors do not detect at least one external object, the processor controls at least one corresponding indication illumination apparatus to provide illumination.

In one embodiment of the present invention, the object storing apparatus further includes a touch element and a display element. The touch element is coupled to the processor, disposed on the cabinet door, and adapted to generate a touch position. The display element is coupled to the processor, disposed on the cabinet door, and adapted to generate a display area to present an image on the cabinet door.

In one embodiment of the present invention, the touch position and the display area do not overlap.

In one embodiment of the present invention, information corresponding to one of the storage element or the external object is displayed on the display area.

In one embodiment of the present invention, the object storing apparatus further includes object blocking mechanisms. The object blocking mechanisms are coupled to the processor, respectively disposed on the corresponding storage elements, and adapted to block the external objects from being placed on or into the corresponding storage elements.

In one embodiment of the present invention, when the scanning operation is activated and the cabinet door detector detects that the cabinet door is opened, the processor controls the object blocking mechanisms to be opened for placing the external object on or into the corresponding storing element.

In one embodiment of the present invention, the object storing apparatus further includes a storing element. The storing element records at least one of original information, extended information, and inventory information of the external object.

In one embodiment of the present invention, the original information is own information of the external object, that is, information generated by performing a text recognition process or an image recognition process on scanning content acquired by the scanning operation.

In one embodiment of the present invention, the original information includes name, capacity, serving size, wine name, product name, wine merchant name, importer, winery name, manufacturer, alcohol content, nutrient content ratio, country of origin, production area, grade, vintage, date of manufacture, vineyard location, production trace, bottling location, and/or manufacturing address.

In one embodiment of the present invention, the extended information is information additionally given to the at least one external object, that is, information generated after an external database or the storing element is searched according to the original information and a search result is associated.

In one embodiment of the present invention, the extended information includes taste descriptions, user experiences, introduction videos, stories, cooking methods, usage patterns, consumer evaluations, meal styles, spot prices, and/or historical prices.

In one embodiment of the present invention, the inventory information is about a storage situation of the external object, that is, information generated by checking the storing element according to the original information.

In one embodiment of the present invention, the inventory information includes local inventory quantity, remote inventory quantity, local storage position, remote storage position, purchase price, purchase time, deposit time, obtaining time, and/or last obtaining time.

In one embodiment of the present invention, the object storing apparatus further includes a temporary storage element. The temporary storage element is disposed in the internal space, arrayed with the storage element, and adapted to temporarily store the external object.

In one embodiment of the present invention, the scanning apparatus is disposed corresponding to the temporary storage element.

In one embodiment of the present invention, the temporary storage element has a temporary storage depth, the storage element has a storage depth, and the temporary storage depth is smaller than the storage depth.

The object access method of the present invention is applied to an object storing apparatus. The object storing apparatus includes a cabinet body and a cabinet door, and storing positions are disposed inside the cabinet body. The object access method includes the following steps: determining whether a cabinet door is opened; and determining, in response to the cabinet door being opened, whether a scanning operation for a first external object is activated, the first external object being not an existing external object at a storing position.

In one embodiment of the present invention, in response to the cabinet door being opened, the method further includes the following step: determining whether the existing external objects are present at the storing positions.

In one embodiment of the present invention, the method further includes the following step: determining, in response to the existing external objects being present and the scanning operation being activated, object storing.

In one embodiment of the present invention, the method further includes the following step: determining, in response to at least one of the existing external objects being not present and the scanning operation being not activated, object obtaining.

In one embodiment of the present invention, the step of determining whether the cabinet door is opened includes the following steps: providing a cabinet door detector for detecting a state of the cabinet door; and determining whether the cabinet door is opened according to the state detected by the cabinet door detector.

In one embodiment of the present invention, in response to the cabinet door being opened, the method further includes the following step: providing illumination of a first brightness.

In one embodiment of the present invention, the method further includes the following step: providing a scanned object detector, the scanned object detector being adapted to detect a state of the first external object; and determining whether the scanning operation is activated according to the state detected by the scanned object detector.

In one embodiment of the present invention, the method further includes the following step: providing, in response to the first external object being present, illumination of a second brightness; and determining to activate the scanning operation, and activating the scanning operation, the second brightness being greater than the first brightness.

In one embodiment of the present invention, after determining that the scanning operation is activated, the method further includes the following step: providing a guidance indication for providing a guidance indication for at least one of the storing positions where the existing external objects are not present.

In one embodiment of the present invention, the method further includes the following step: closing the guidance indication in response to the first external object being present at the storing position provided with the guidance indication.

In one embodiment of the present invention, after determining the object storing, the method further includes the following step: presenting at least one of extended information and inventory information of the first external object.

In one embodiment of the present invention, presenting at least one of extended information and inventory information of the first external object includes the following step: determining whether the cabinet door is closed, and presenting, in response to the cabinet door being closed, at least one of extended information and inventory information of the first external object.

In one embodiment of the present invention, after determining the object obtaining, the method further includes the following steps: determining an inventory of the existing external object in the object storing apparatus; and providing an ordering service according to the inventory, the ordering service being related to the existing external object.

In one embodiment of the present invention, providing an ordering service according to the inventory includes the following steps: determining whether the cabinet door of the object storing apparatus is closed; and providing, in response to the cabinet door being closed, the ordering service.

The object obtaining service method of the present invention is applied to an object storing apparatus. The object obtaining service method includes the following steps: determining an inventory of the external object in the object storing apparatus; and providing an ordering service according to the inventory, the ordering service being related to the external object.

In one embodiment of the present invention, providing an ordering service according to the inventory includes the following steps: determining whether the cabinet door of the object storing apparatus is closed; and providing, in response to the cabinet door being closed, the ordering service.

In one embodiment of the present invention, providing an ordering service according to the inventory includes the following step: providing the ordering service for the same item according to information of the external object.

In one embodiment of the present invention, providing an ordering service according to the inventory includes the following step: providing the ordering service of a recommended vintage according to purchase time or deposit time and last obtaining time of inventory information of the external object.

In one embodiment of the present invention, providing an ordering service according to the inventory includes the following step: providing the ordering service of a popular item according to extended information of the external object.

In one embodiment of the present invention, determining the inventory of the object storing apparatus includes the following steps: determining whether all inventories in the object storing apparatus are smaller than a first preset value; and determining whether an inventory of an obtained external object in the object storing apparatus is smaller than a second preset value in response to all the inventories being smaller than the first preset value.

In one embodiment of the present invention, providing an ordering service according to the inventory includes the following steps: providing the ordering service in response to the inventory of the obtained external object being smaller than the second preset value.

In one embodiment of the present invention, providing an ordering service according to the inventory includes the following steps: providing the ordering service in response to all the inventories being smaller than the first preset value.

In one embodiment of the present invention, providing an ordering service includes the following step: performing direct online purchase or providing an ordering indication.

The object indication method of the present invention is applied to an object storing apparatus. The object storing apparatus includes a cabinet body and a cabinet door. Multiple storing positions are disposed inside the cabinet body. The object indication method includes the following steps: providing a touch element, the touch element being disposed on the cabinet door; and indicating an object at the corresponding storing position according to a touch position detected by the touch element.

In one embodiment of the present invention, indicating an object at the corresponding storing position includes the following step: controlling an object illumination apparatus corresponding to the storing position to provide illumination.

In one embodiment of the present invention, indicating an object at the corresponding storing position includes the following step: providing a display element, the display element overlapping with the touch element; and presenting, according to the touch position, related information corresponding to the storing position or the external object in an area on the display element different from the touch position.

In one embodiment of the present invention, after indicating an object at the corresponding storing position, the method further includes the following step: determining whether to switch the area in response to the change of the touch position.

In one embodiment of the present invention, after indicating an object at the corresponding storing position, the method further includes the following step: stopping indicating the object in response to the touch element not detecting the touch position.

Based on the foregoing, according to the object storing apparatus, the object access method, the object obtaining service method, and the object indication method thereof provided by the embodiments of the present invention, a user can be guided to store an object, and related information of the object is provided correspondingly. The information provided is not limited to the object itself, but also includes additional extended information and inventories stored in the object storing apparatus. In addition, after a user obtains an object, the embodiment of the present invention may further provide an ordering service related to the object. Thus, an object storing process of the user can be facilitated and changed.

In order to make the aforementioned and other features and advantages of the present invention comprehensible, embodiments accompanied with figures are described in detail below.

BRIEF DESCRIPTION OF THE DRAWINGS

FIGS. 6B to 6F are schematic diagrams of object indication according to one embodiment of the present invention.

DESCRIPTION OF THE EMBODIMENTS

Figure 1:
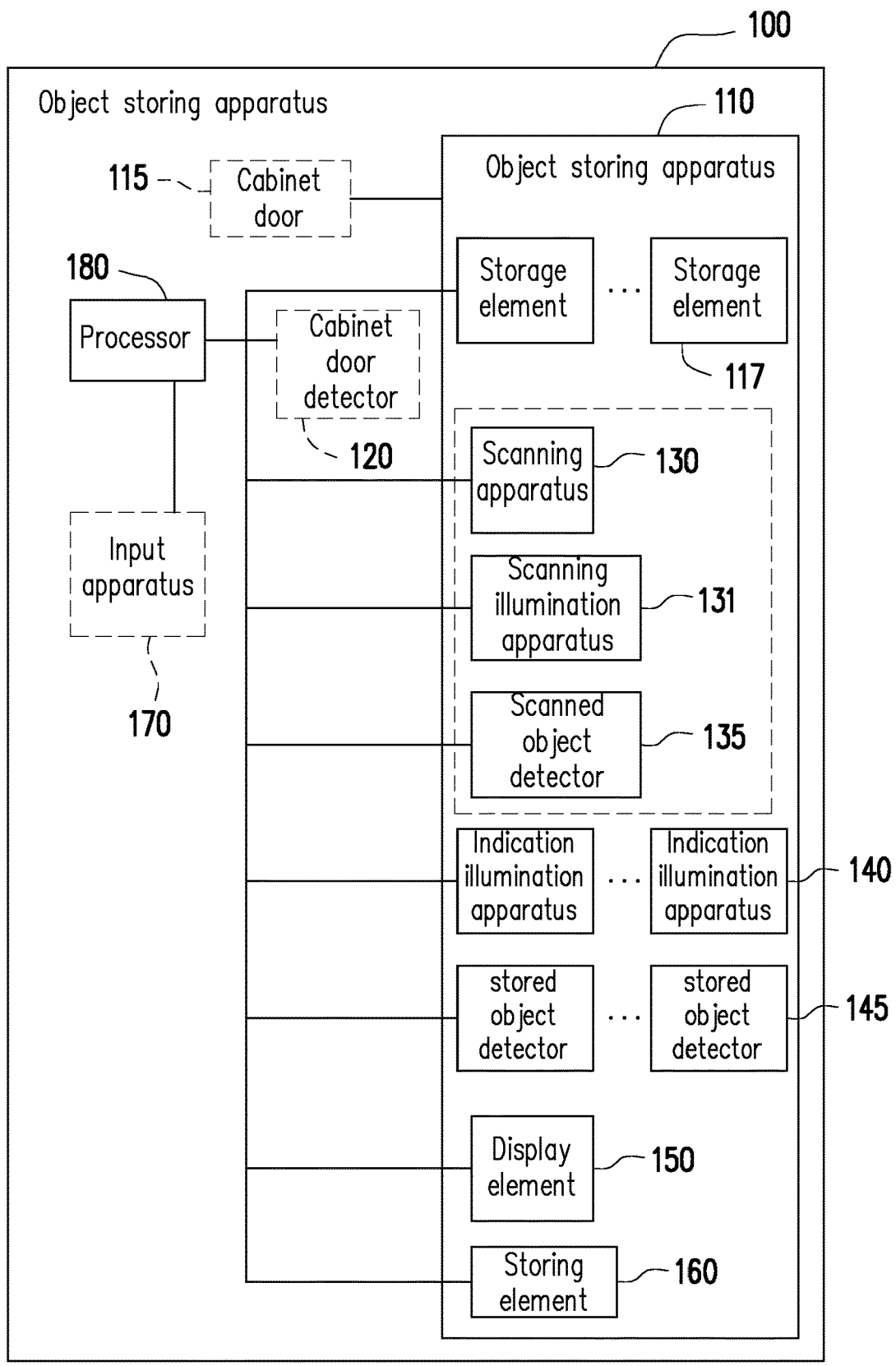
FIG. 1 is a component block diagram of an object storing apparatus according to one embodiment of the present invention.

FIG. 1 is a component block diagram of an object storing apparatus 100 according to one embodiment of the present invention. Referring to FIG. 1, the object storing apparatus 100 includes, but is not limited to, a cabinet body 110, one or more storage elements 117, a scanning apparatus 130, a scanning illumination apparatus 131, a scanned object detector 135, one or more indication illumination apparatuses 140, one or more stored object detectors 145, a display element 150, a storing element 160, and a processor 180.

The cabinet body 110 may be of any three-dimensional shape and has an internal space. The storage element 117 is disposed inside the internal space, and the storage element 117 stores an external object (e.g., a wine bottle, a model, food, etc.), so that the external object can be fixedly placed on the storage element 117. It should be noted that the storage element 117 will also be changed according to the shape of different external objects. In some embodiments, the object storing apparatus 100 further includes a cabinet door 115. The cabinet door 115 is movably disposed (e.g., in a pivotal connection manner or a slide rail-based manner) on the cabinet body 110. The cabinet door 115 can open or close the internal space of the cabinet body 110.

The scanning apparatus 130 may be any type of image capture apparatus (e.g., a barcode scanner, a camera, a video camera, etc.). The scanning apparatus 130 may take an image of an external object to acquire graphic information from the external object.

The scanning illumination apparatus 131 may be a halogen lamp or an LED lamp. The scanning illumination apparatus 131 is disposed in the internal space of the cabinet body 110, and the scanning illumination apparatus 131 is adapted to illuminate a scanning area of the scanning apparatus 130.

The scanned object detector 135 is disposed in the internal space of the cabinet body 110, and the scanned object detector 135 may be a mechanical switch such as a micro switch, a touch switch or a changeover switch generating an induction change by deformation or an external force, a pressure sensor for detecting the external force, a brightness sensor for detecting brightness such as an image capture apparatus or a light sensor, an infrared/ultrasonic transceiver for detecting displacement, rotation or other motion states, a direction angle sensor, or other sensors.

The indication illumination apparatus 140 may be a halogen lamp or an LED lamp. The indication illumination apparatuses 140 are disposed in the internal space of the cabinet body 110, and the indication illumination apparatuses 140 are in one-to-one correspondence with the storage elements 117.

The implementation of the stored object detector 145 may refer to the scanned object detector 135, and details are not described herein. The stored object detectors 145 are disposed in the internal space of the cabinet body 110, and the stored object detectors 145 are in one-to-one correspondence with the storage elements 117 to detect whether the external objects are stored at the corresponding storage elements 117.

In addition, in some embodiments, the object storing apparatus 100 is further provided with a cabinet door detector 120, the implementation of the cabinet door detector 120 may refer to the scanned object detector 135, and details are not described herein. The cabinet door detector 120 is adapted to detect that the cabinet door 115 is opened or closed.

The display element 150 may be an LCD, an LED display, or an OLED display. In one embodiment, the display element 150 is a transparent display and is disposed on the cabinet door 115 (i.e., combined with the cabinet door 115), the area can be adjusted to be partially or fully transparent or non-transparent as required, and an image is presented on the cabinet door 115. In another embodiment, the display element 150 is not integrated with the cabinet door 115.

The storing element 160 may be various types of storing media such as SSD, ROM, HDD, or RAM. In the present embodiment, the storing element 160 is adapted to record original information, extended information, and/or inventory information of the external object, and the description of the information is to be described in detail in the subsequent embodiments.

In some embodiments, the object storing apparatus 100 may further include an input apparatus 170. The input apparatus 170 may be a touch element, a microphone, a keyboard, a mouse, or a communication receiver. The input apparatus 170 is adapted to acquire input operations of a user or data of an external apparatus.

The processor 180 may be a processing unit such as a CPU, a micro-controller, a chip, an application-specific integrated circuit (ASIC), or a field programmable gate array (FPGA), and the processor 180 is coupled to the cabinet door detector 120, the scanning apparatus 130, the scanning illumination apparatus 131, the scanned object detector 135, the indication illumination apparatus 140, the stored object detector 145, the display element 150, the storing element 160, and the input apparatus 170, thereby controlling the functions of these apparatuses or elements.

Figure 2A:
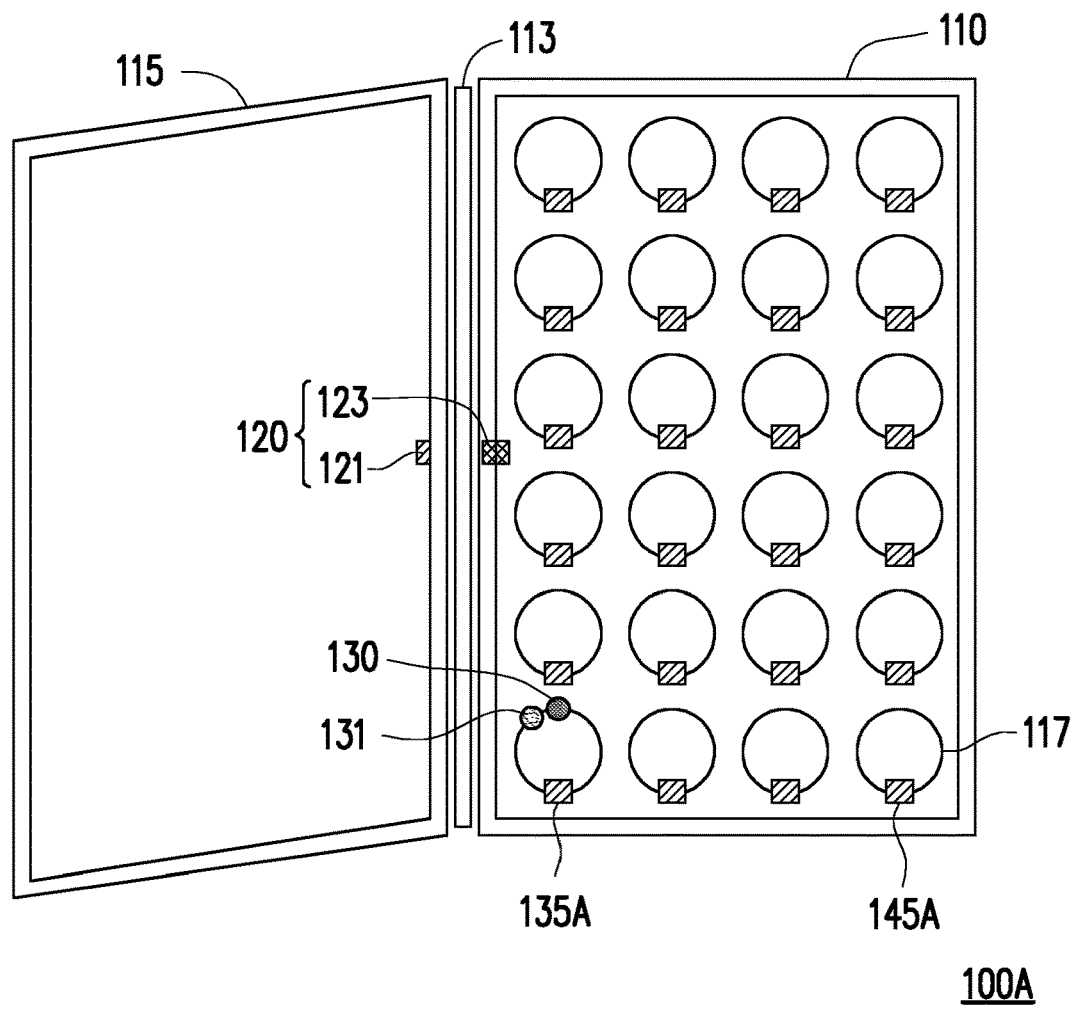
FIG. 2A is a schematic diagram of an object storing apparatus according to a first embodiment of the present invention.

There are many types of implementations of the object storing apparatus 100. FIG. 2A is a schematic diagram of an object storing apparatus 100A according to a first embodiment of the present invention. Referring to FIG. 2A, the cabinet body 110 of the object storing apparatus 100A is pivotally connected to the cabinet door 115 through a rotary shaft 113, so that the cabinet door 115 can be pivotally opened or closed. The cabinet door detector 120 includes a protruding member 121 disposed on the cabinet door 115 and a micro switch 123 disposed in the cabinet body 110, and detects a variation by applying an external force to the micro switch 123 through the protruding member 121. The scanning apparatus 130 corresponds to one storage element 117 (a wine bottle holder is taken as an example, and each storage element 117 corresponds to a storage position), and photographs an object on the storage element 117. The scanning illumination apparatus 131 may provide illumination (i.e., supplementary lighting) for the scanning apparatus 130 to perform a scanning operation, or is adapted to indicate the position of the scanning apparatus 130. A micro switch 135A (i.e., the scanned object detector 135) and a micro switch 145A (stored object detector 145) are disposed on a storage element 117 separately, and detect whether there is an object on the corresponding storage element 117.

Figure 2B:
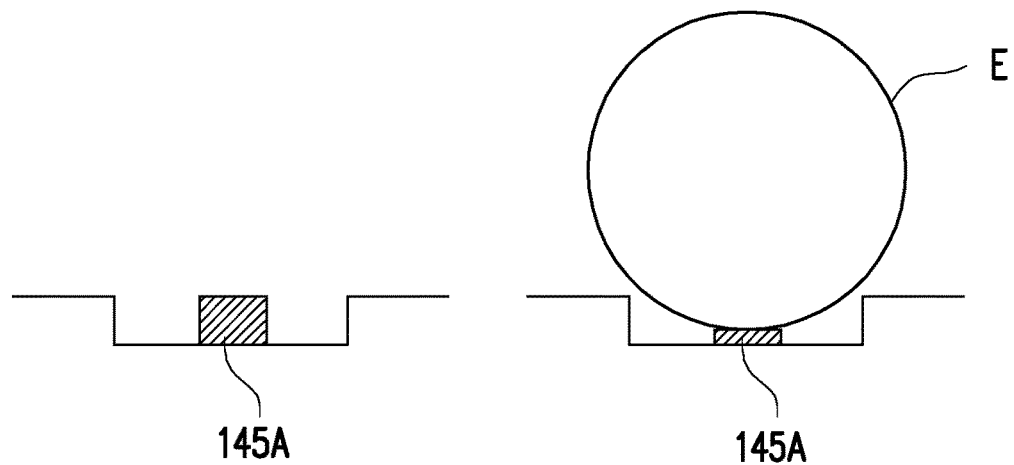
FIG. 2B is a schematic diagram of object detecting according to the first embodiment of the present invention.

FIG. 2B is a schematic diagram of object detecting according to the first embodiment of the present invention. Referring to FIG. 2B, the micro switch 145A is taken as an example, and the micro switch 135A may refer to it. The micro switch 145A is arranged below, for example, the storage element 117. When an external object E is placed on the storage element 117 (as shown in the right figure), the micro switch 145A will be deformed by an external force or its sensed value changes, and the processor 180 accordingly knows that there is an object on the storage object 117 corresponding to the micro switch 145A (i.e., determined by the application of an external force).

Figure 2C:
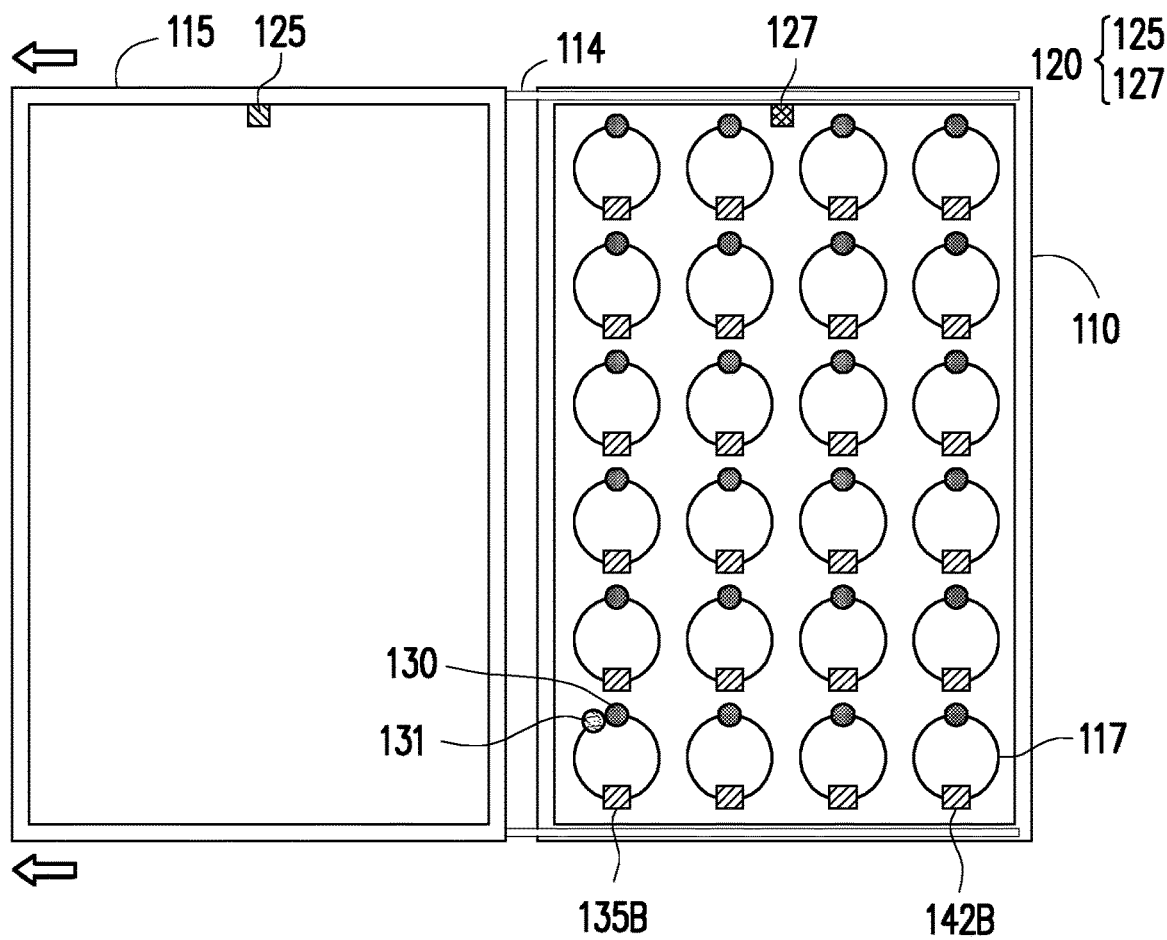
FIG. 2C is a schematic diagram of an object storing apparatus according to a second embodiment of the present invention.

FIG. 2C is a schematic diagram of an object storing apparatus 100B according to a second embodiment of the present invention. Referring to FIG. 2B, the difference from the first embodiment is that the cabinet body 110 of the object storing apparatus 100B is connected to the cabinet door 115 through a slide rail 114, so that the cabinet door 115 may slide away from or near the cabinet body 110. The cabinet door detector 120 includes a blocking member 125 disposed on the cabinet door 115, and a light sensor 127 disposed on the cabinet body 110. The blocking member 125 may shield the light sensor 127 to enable the sensing value of the light sensor 127 to be changed. A light sensor 135B (i.e., the scanned object detector 135) and a light sensor 145C (i.e., the stored object detector 145) are disposed on a storage element 117 separately, and detect whether there is an object on the corresponding storage element 117. In addition, the storage elements 117 corresponding to the scanned object detector 135 and the stored object detector 145 are arranged substantially in an array.

Figure 2D:
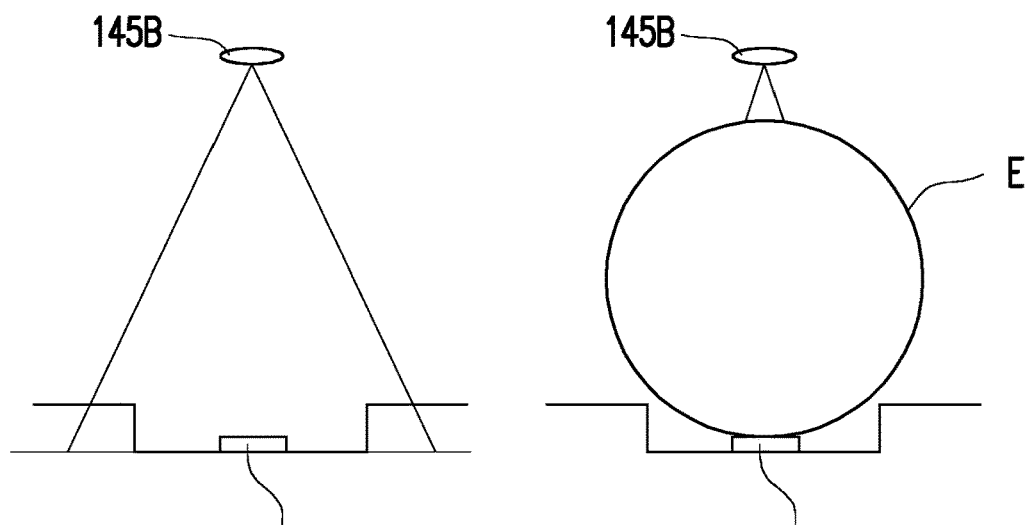
FIG. 2D is a schematic diagram of object detecting according to the second embodiment of the present invention.

FIG. 2D is a schematic diagram of object detecting according to the second embodiment of the present invention. Referring to FIG. 2D, the light sensor 145C is taken as an example, and the light sensor 135B may refer to it. The light sensor 145C is arranged below, for example, the storage element 117, and an LED lamp 145 is located right above the light sensor 145C and provides illumination. When an external object E is placed on the storage element 117 (as shown in the right figure), the external object E will shield illumination emitted by the LED lamp 145, so that the brightness detected by the light sensor 145C is changed (for example, darken). The processor 180 accordingly knows that there is an object on the storage object 117 corresponding to the light sensor 145C.

Figure 3A:
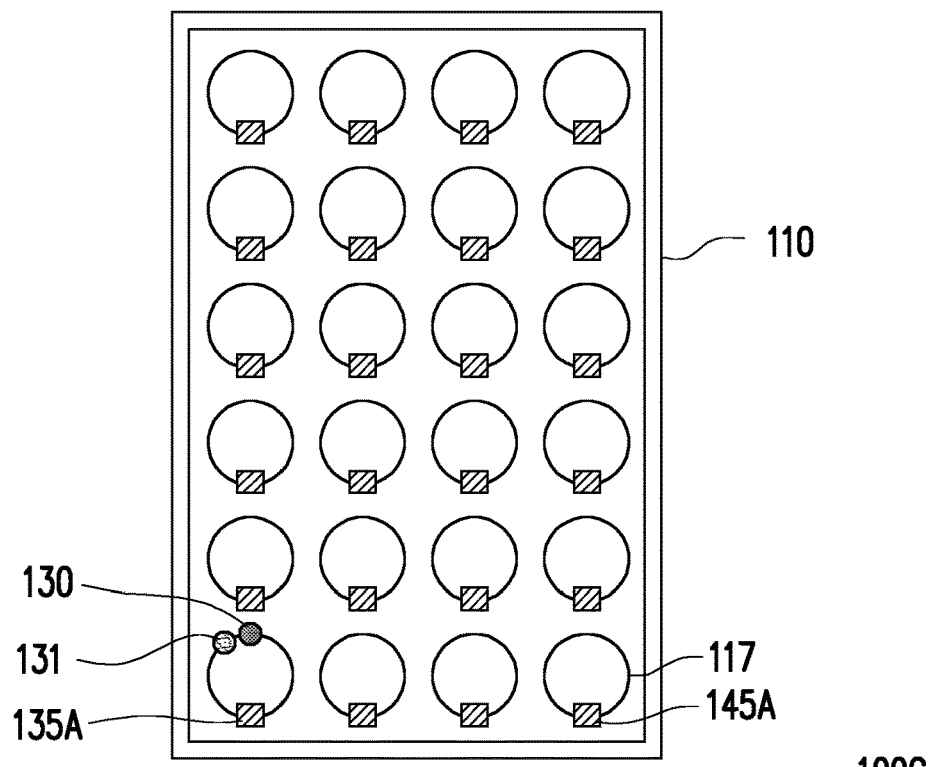
FIG. 3A is a schematic diagram of an object storing apparatus according to a third embodiment of the present invention.

The object storing apparatuses 100A and 100B of the first and second embodiments each have the cabinet door 115, and the implementation of the cabinet door 115 is not described below, so that an external object can be directly obtained. FIG. 3A is a schematic diagram of an object storing apparatus 100C according to a third embodiment of the present invention. Referring to FIG. 3A, the difference from the first embodiment is that the object storing apparatus 100C is not provided with the cabinet door 115 and the cabinet door detector 120.

Figure 3B:
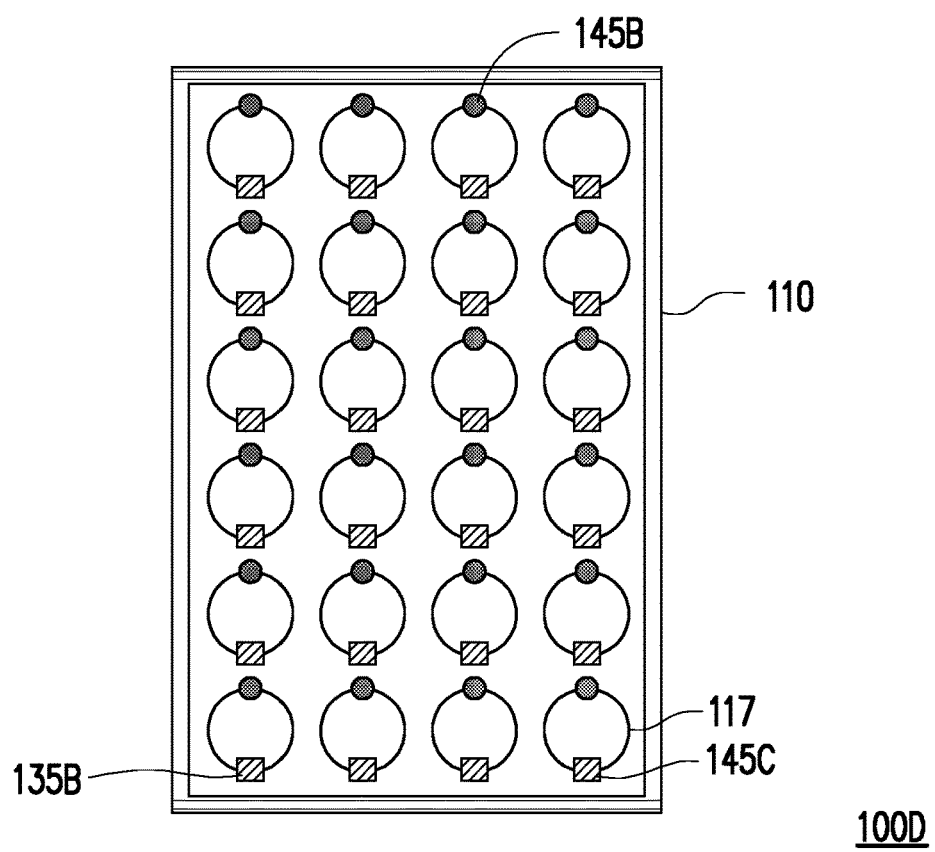
FIG. 3B is a schematic diagram of an object storing apparatus according to a fourth embodiment of the present invention.

FIG. 3B is a schematic diagram of an object storing apparatus 110 D according to a fourth embodiment of the present invention. Referring to FIG. 3B, the difference from the second embodiment is that the object storing apparatus 100D is not provided with the cabinet door 115 and the cabinet door detector 120. It should be noted that, in some scenarios, the object storing apparatus 100D may not be provided with the scanning apparatus 130, the scanning illumination apparatus 131, and the scanned object detector 135.

It should be noted that the foregoing first to fourth embodiments are illustrated by using a wine cabinet as an example, but an application user can make a change to store other objects as required. In addition, the shape, position, and number shown in FIGS. 2A to 3B are for illustrative purposes only, and the application user can make an adjustment as required.

The object storing apparatuses 100 to 100D of the foregoing embodiments are adapted to store external objects. A user only needs to store the external objects to the object storing apparatuses 100 to 100D, or obtain the external objects from the object storing apparatuses 100 to 100D. Providing more convenient and intelligent functions for the object storing and obtaining processes will help to improve or change the storage habits of the user. In order to help understand the operation flow of the embodiment, the following description will be made in accordance with different processes in combination with the apparatus and mechanism components of the object storing apparatus 100 to 100D in FIG. 1, 2A, 2C, 3A, or 3B.

Figure 4:
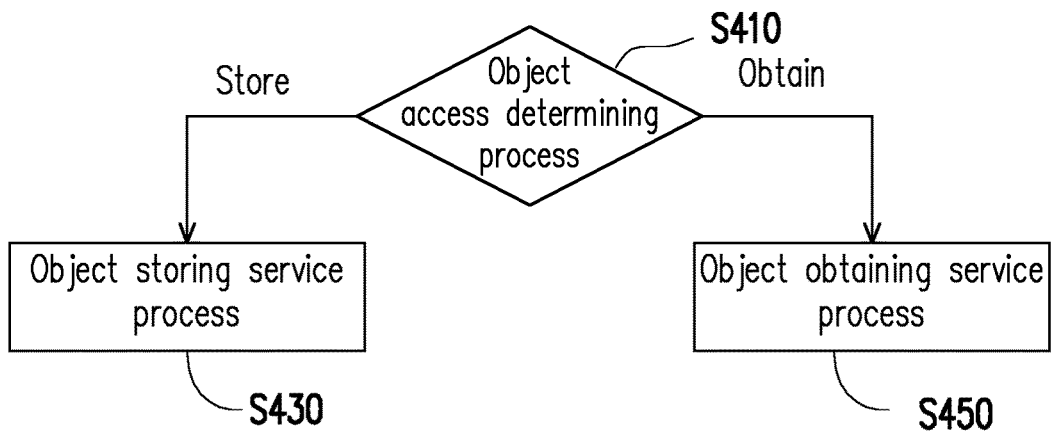
FIG. 4 is a flowchart of an object access method according to one embodiment of the present invention.

FIG. 4 is a flowchart of an object access method according to one embodiment of the present invention. Referring to FIG. 4, the object storing apparatus 100 first performs an object access determining process (step S410) to determine whether an operation of a user is object storing or object obtaining. In addition, the object storing apparatus 100 accordingly provides a corresponding object storing service process (step S430) or object obtaining service process (step S450). The details will be described below.

Figure 5A:
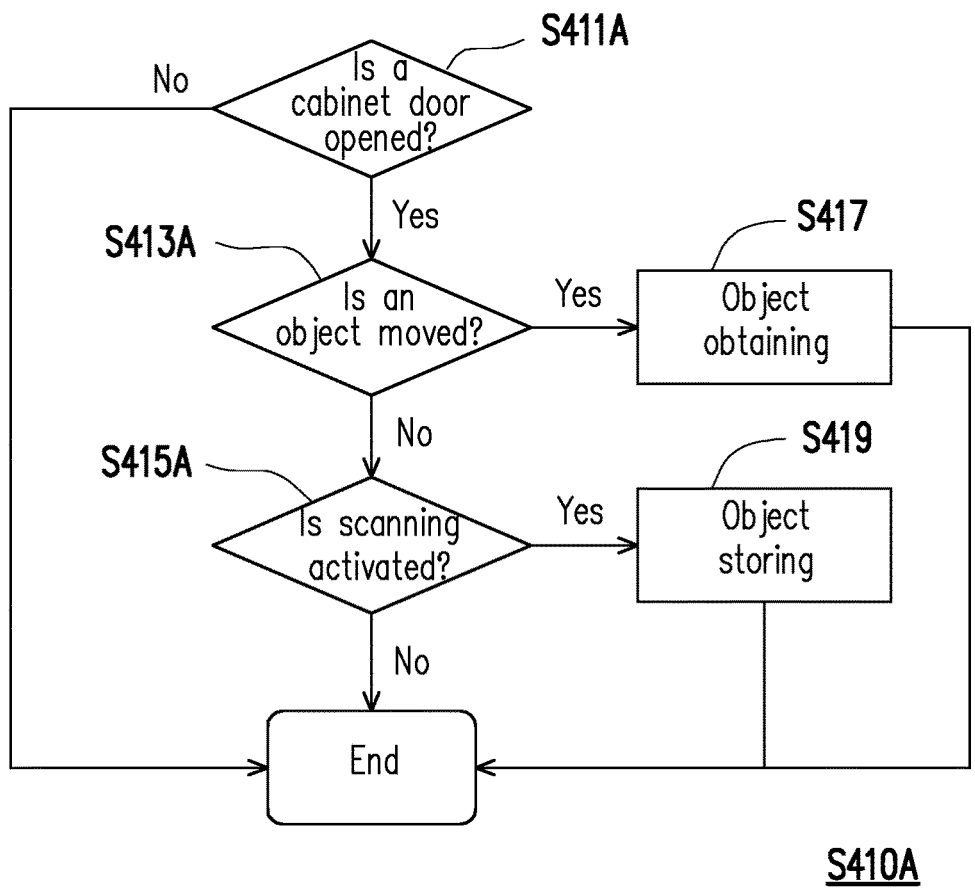
FIGS. 5A to 5C are flowcharts of an object access determining method according to four embodiments of the present invention.
Figure 5B:
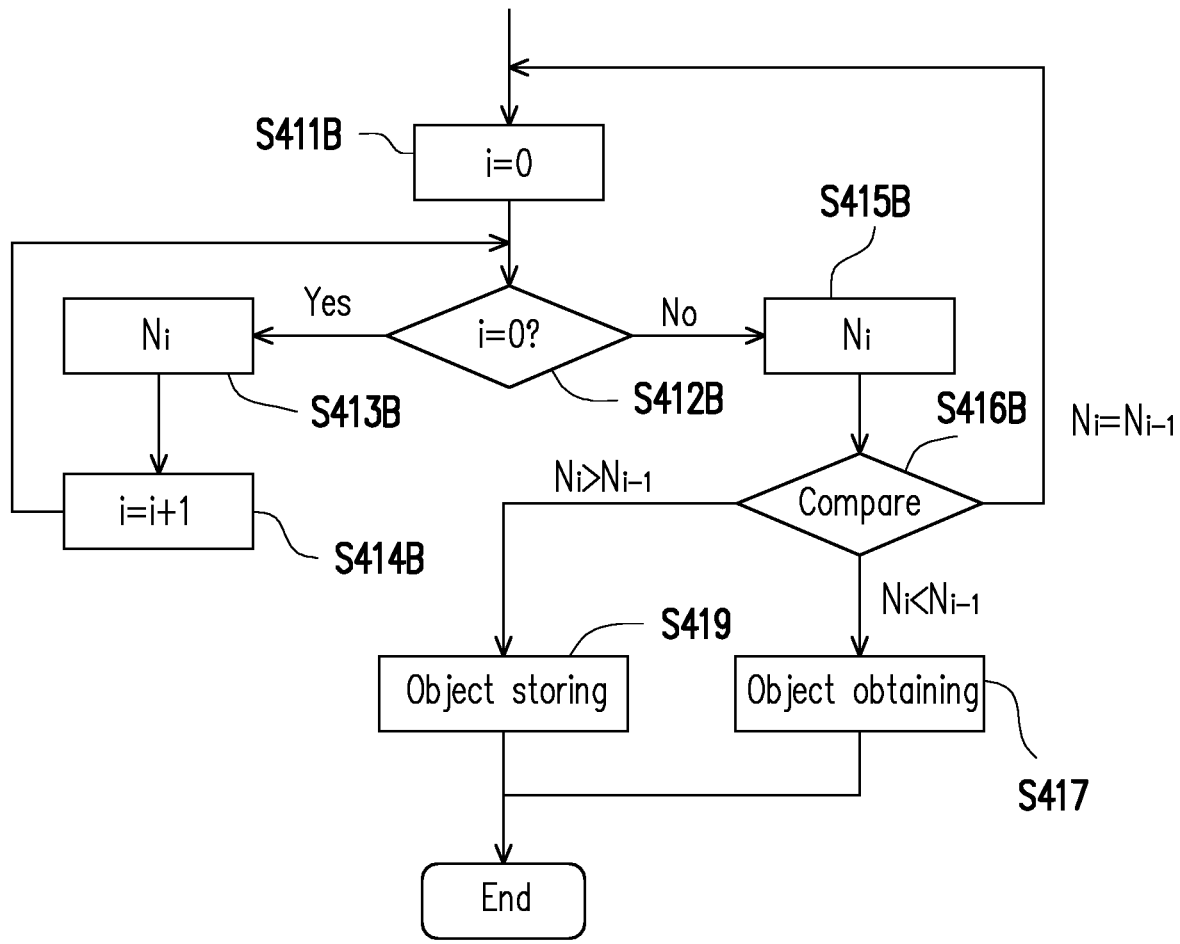
Figure 5C:
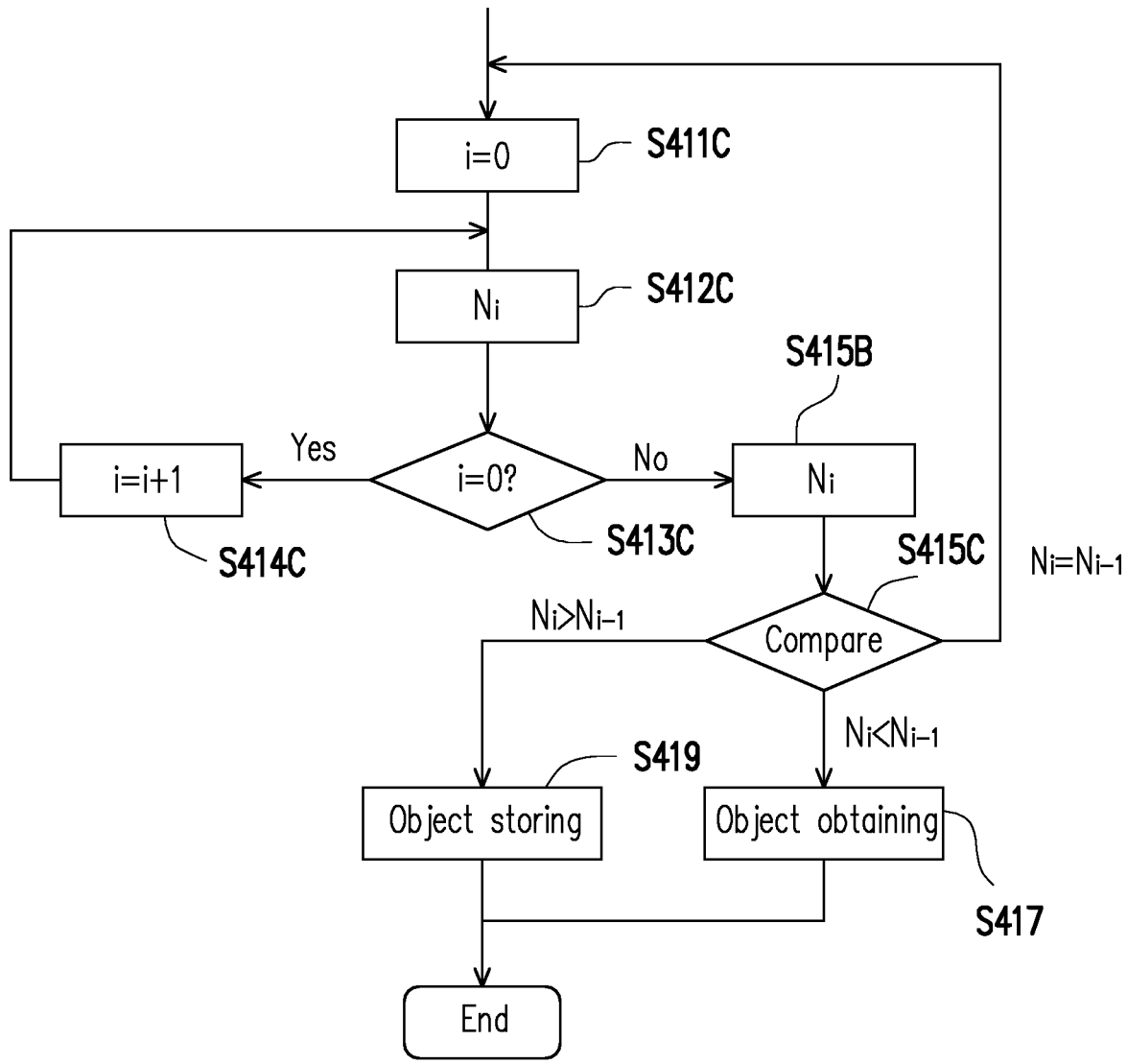

There are many variations in the object access determining process (step S410). FIGS. 5A to 5C are flowcharts of an object access determining method S410 according to four embodiments of the present invention. Referring to FIG. 5A (step S410A), the object storing apparatus 100A having the cabinet door 115 and the scanning apparatus 130 shown in the first embodiment is taken as an example. The processor 180 determines whether the cabinet door 115 is closed through the micro switch 123 (i.e., the internal space of the cabinet body 110 is closed) (step S411A). If the cabinet door 115 is opened, the processor 180 further determines, through the micro switch 145A, whether the existing external object (which will be recorded after object storing is previously completed) at a storing position of the corresponding storage element 117 is present/moved (in other words, whether it is obtained by the user) (step S413A). If the existing external object at the storing position is not present or moved, the processor 180 determines that a current behavior of the user is object obtaining (step S417). On the other hand, if the existing external object at the storing position is still present or not moved, the processor 180 will further determine whether the scanning operation of the scanning apparatus 130 is activated (step S415A). The processor 180 may determine, through the micro switch 135A, whether the external object at a storing position of the corresponding storage element 117 is present (in other words, whether it is put in by the user). If an external object is detected, the processor 180 may fill light by indication illumination apparatuses 140 and perform image capture on the external object (i.e., activate the scanning operation), and the processor 180 accordingly determines that the current behavior of the user is object storing (step S419).

It should be noted that the foregoing process is applied to the object storing apparatus 100B having the cabinet door 115 and the scanning apparatus 130 in the second embodiment, and the processor 180 may determine, through the light sensor 127, whether the cabinet door 115 is closed (step S411A), may determine, through the light sensor 145C, whether the existing external object at the storage position of the corresponding storage element 117 is present/moved (in other words, whether it is obtained by the user) (step S413A), and may determine, through the light sensor 135B, whether the scanning operation is activated (step S415A). In addition, in some embodiments the execution order of confirming object moving (step S413A) and scanning activation (step S415A) is adjustable in FIG. 4A. For example, after the processor 180 confirms that the scanning operation is not activated, and then further determines the displacement of the existing external object.

It can be seen that the foregoing process confirms the operation behavior of the user through the steps of cabinet door opening, object moving, and scanning activation. In addition, the processor 180 may control the scanning apparatus 130 to activate the scanning operation according to a detection result of the cabinet door detector 120 (for example, whether the cabinet door 115 is opened). However, for the object storing apparatus 110C without the cabinet door 115, in one embodiment, steps S411A and S411B in FIGS. 5A and 5B (i.e., the step of determining whether the cabinet door 115 is open) may be omitted.

Referring to FIG. 5B (step S410B), the object storing apparatus 100D without the cabinet door 115 and the scanning apparatus 130 shown in the fourth embodiment is taken as an example. Since object storing is not confirmed by the activation of the scanning apparatus 130, this process is determined based on the inventory change of an object. Starting from i being 0 (step S411B), after the processor 180 confirms that i is 0 (step S412B), it is determined, through all the light sensors 145C, whether there is an external object at the corresponding storage position, and the number of vacancies $N_i$ (i.e., the total number of storage positions where no external objects are stored) is calculated and recorded accordingly. After 1 is added to i (step S414B), the processor 180 confirms that i is not 0 (step S412B), and calculates and records the number of vacancies $N_i$ again (step S415B). Next, the processor 180 compares the number of vacancies $N_i$ and the number of vacancies $N_{i-1}$ recorded twice before and after (step S416B). If the number of vacancies $N_{i-1}$ recorded first is greater than the number of vacancies $N_i$ recorded later, the processor 180 determines object obtaining (step S417). If the number of vacancies $N_i$ recorded later is greater than the number of vacancies $N_{i-1}$ recorded first, the processor 180 determines object storing (step S419). It should be noted that the different i values represent different time points, and if the number of vacancies $N_i$ and the number of vacancies $N_{i-1}$ recorded in succession are the same, the processor 180 continues to determine the difference (return to step S411B).

Referring to FIG. 5C (step S410B), the object storing apparatus 100D without the cabinet door 115 and the scanning apparatus 130 shown in the fourth embodiment is taken as an example. The difference from the embodiment of FIG. 5B is that the processor 180 calculates and records the current number of vacancies $N_i$ before conforming that i is 0 (step S413C). The processor 180 adds 1 to i after confirming that i is 0 (step S414C).

It should be noted that, if the actual usage scenario is that a user stores external objects in the object storing apparatuses 100 to 100D, the embodiment of the present invention can also provide guidance for the user to record the related information and storage positions of the objects through illumination. The following description is continued.

Figure 6A:
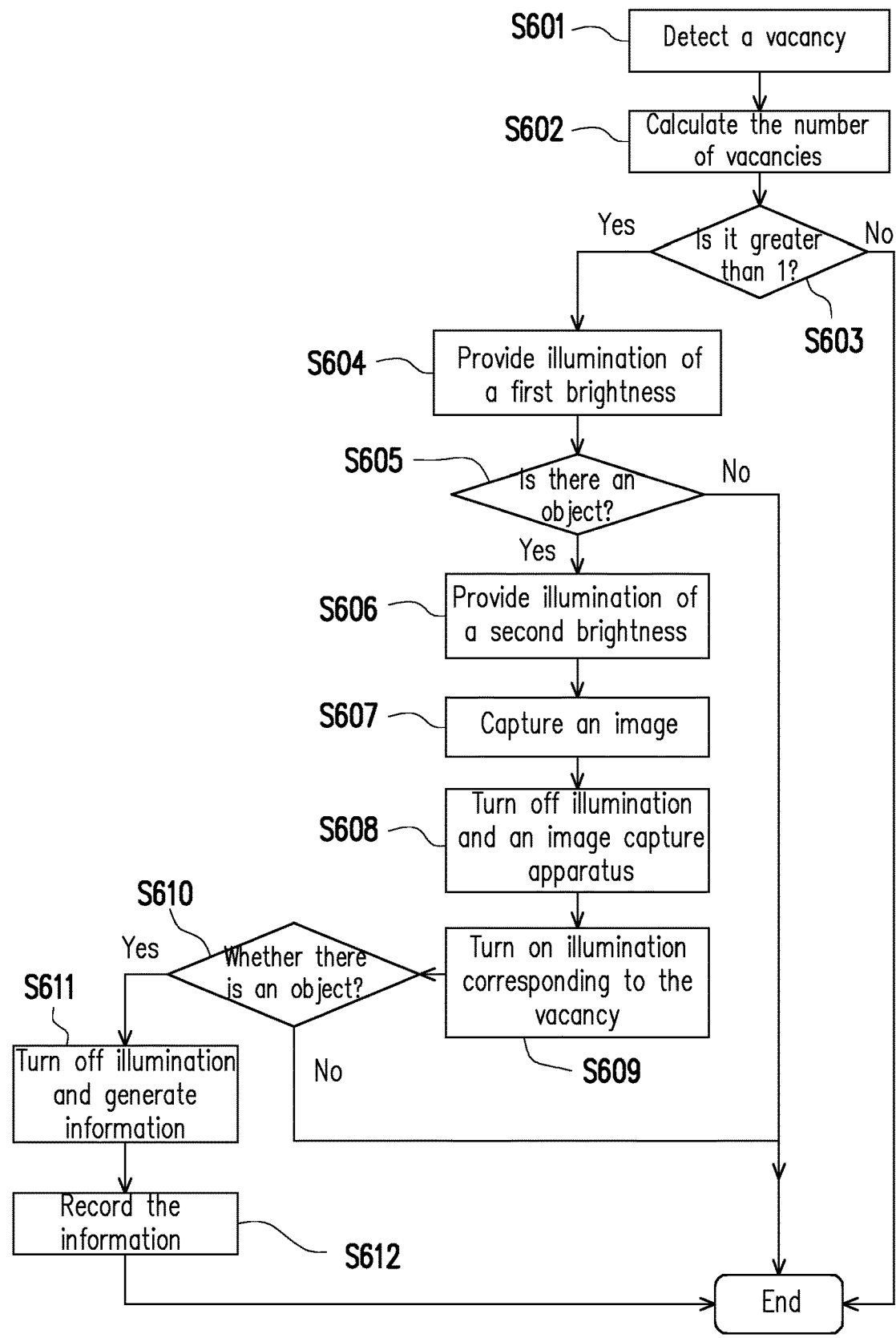
FIG. 6A is a flowchart of an object storing method according to one embodiment of the present invention.

FIG. 6A is a flowchart of an object storing method according to one embodiment of the present invention. Referring to FIG. 6A, the object storing apparatus 100A in the first embodiment is taken as an example, and the example may be applied to the object storing apparatuses 100B to 100C. The processor 180 detects the current number of vacancies (step S601) by, for example, determining object moving in step S413A, or determining vacancies in steps S413B, S415B, and S412C, and accordingly calculates the number of vacancies (step S602). If there is no vacancy (i.e., the number of vacancies is zero), the position cannot be provided for storage. If there is still a vacancy (i.e., the number of vacancies is greater than or equal to 1), the processor 180 controls the scanning illuminating apparatus 131 (taking an adjustable LED as an example) to illuminate a scanning area of the scanning apparatus 130 (i.e., a shooting range of the scanning apparatus 130) with a first brightness (step S604). Next, the processor 180 determines, through the micro switch 135A, whether there is an external object at the corresponding storage position (step S605). If there are no external objects, no scanning and subsequent guidance are required.

If the external object is detected, the processor 180 controls the scanning illumination apparatus 131 to illuminate the scanning area of the scanning apparatus 130 with a second brightness (step S606). The second brightness is different from the first brightness in step S604. If the first brightness is insufficient to make the result of the subsequent scanning operation easy to determine, the second brightness will be greater than the first brightness; in other embodiments, it may be that the first brightness is greater than the second brightness. Next, the processor 180 determines to activate a scanning operation, activates the scanning apparatus 130 (for example, an image capture apparatus) to perform the scanning operation to capture an image including an external object in a specific area (step S607), and generates object photo information. The processor 180 may turn off the illumination of the scanning apparatus 130 and the scanning illumination apparatus 131 (step S608), and turn on the illumination of the indication illumination apparatus 140 corresponding to a vacancy (i.e., a storage position where the existing external object is not present) (step S609) (i.e., a visually guided storing indication). The processor 180 then determines whether the micro switch 145A corresponding to the vacancy detects the presence of an external object (step S610), and turns off the illumination of the indication illumination apparatus 140 (i.e., turning off a guidance indication) after confirming that an external object is present (i.e., the external object has been placed). The processor 180 generates position information related to the currently stored external object (step S611), and records the object photo information and the position information to the storing element 160 (step S612). On the other hand, if the scanning operation is activated and the micro switch 145A (i.e., stored object detector 145) does not detect the placement of an external object, the processor 180 controls the indication illumination apparatus 140 corresponding to the vacancy to continue providing illumination.

An application scenario is assumed to be that a user wants to store wine into the object storing apparatus 100A. FIGS. 6B to 6F are schematic diagrams of object indication according to one embodiment of the present invention. Referring first to FIG. 6B, when the cabinet door 115 is closed, both the scanning illumination apparatus 131 and the indication illumination apparatus 140 are turned off or provide illumination that is less than a threshold value. Referring to FIG. 6C, when the cabinet door 115 is opened by the user, the scanning illumination apparatus 131 (at the lowermost left corner) is slightly bright (i.e., first brightness) to guide the user to record the wine. Referring to FIG. 6D, the user puts a wine bottle into the storage element 117 corresponding to the scanning apparatus 130. At this time, the scanning illumination apparatus 131 provides brighter illumination (i.e., second brightness), and the scanning apparatus 130 (a flashlight may be added for further filling light) will photograph a wine label. Referring to FIG. 6E, the scanning illumination apparatus 131 stops providing illumination, and the indication illumination apparatus 131 corresponding to the vacancy (a diagonal net in the figure indicates that there is an object and a blank net indicates that there is no object) will illuminate (at a dotted circle shown in the figure). Referring to FIG. 6F, the scanning illumination apparatus 131 corresponding to a position where the stores a wine bottle first stops providing illumination, then the scanning illumination apparatus 131 corresponding to other vacancies will also be dimmed, and after all the scanning illumination apparatuses 131 are turned off, the scanning illumination apparatus 131 provides illumination again.

Figure 7A:
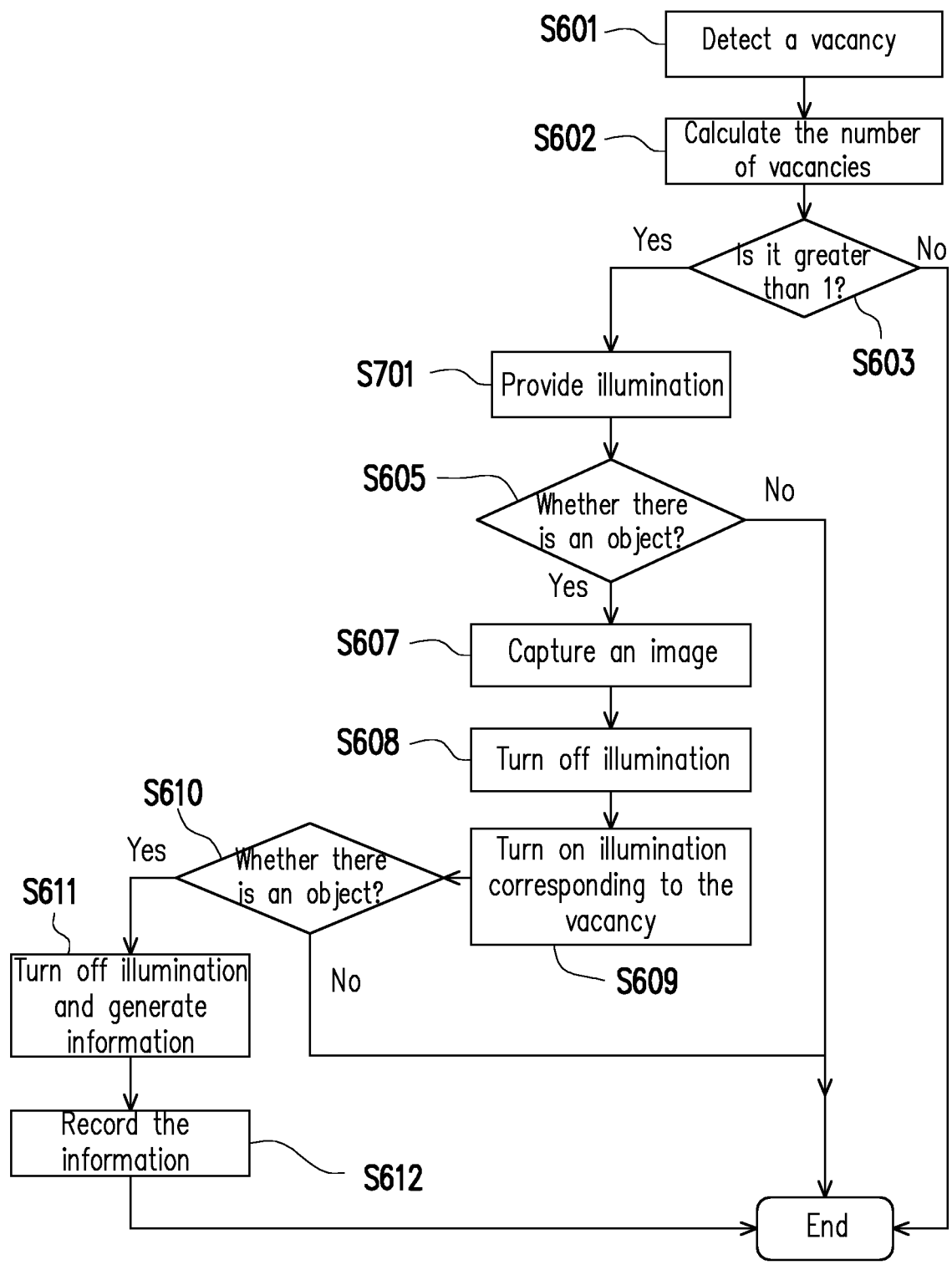
FIGS. 7A to 7B are flowcharts of an object storing method according to two embodiments of the present invention.

It should be noted that the process of FIG. 6A can also be changed. FIG. 7A is a flowchart of an object storing method according to one embodiment of the present invention. Referring to FIG. 7A, the difference from the embodiment of FIG. 6A is that the scanning illumination apparatus 131 provides only illumination of one brightness (step S701), and the processor 180 continuously provides illumination of the same brightness through the scanning illumination apparatus 131 after confirming that there is an object at a storage position corresponding to the scanning apparatus 130 (step S605).

Figure 7B:
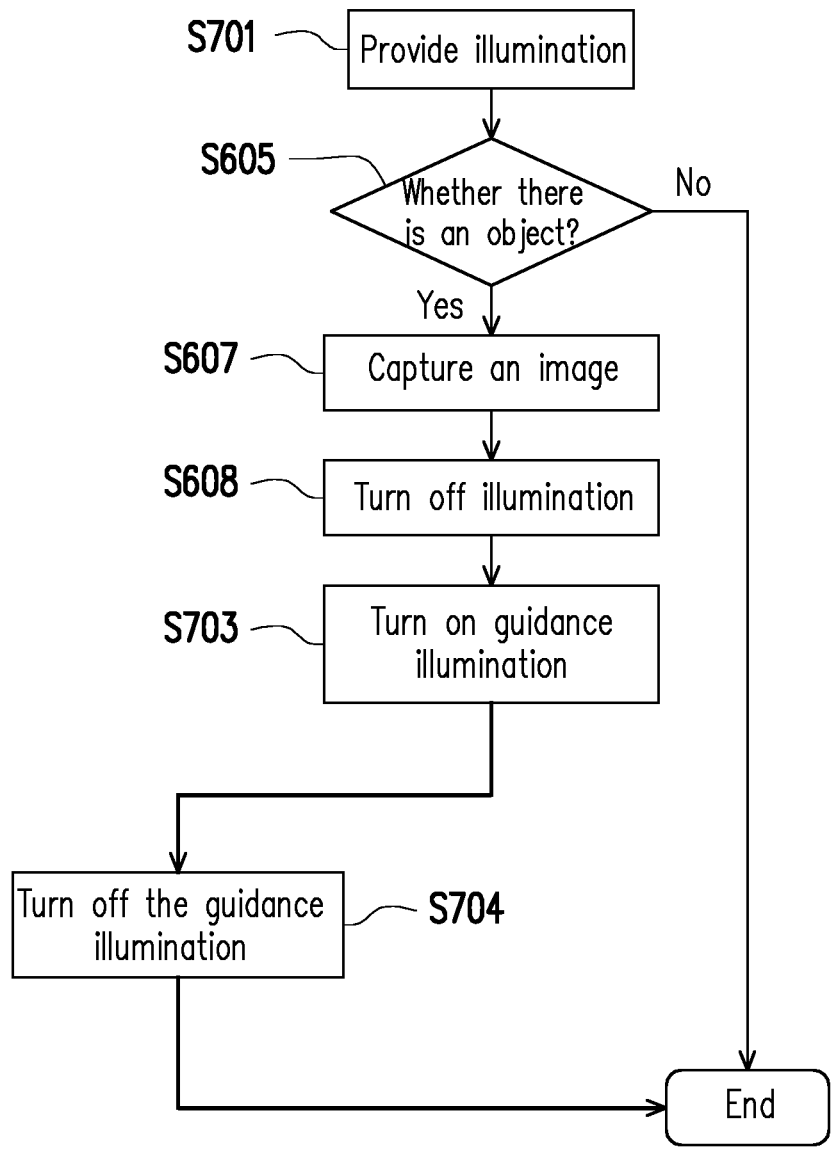

In addition, FIG. 7B is a flowchart of an object storing method according to one embodiment of the present invention. Referring to FIG. 7B, the difference from FIG. 7A is that the processor 180 will directly provide illumination without confirming the vacancy situation (step S701). Alternatively, the processor 180 directly controls the indication illumination apparatus 140 to provide guidance illumination (step S703), and directly turns off the guidance illumination after a certain time (e.g., 5 or 10 seconds) (step S704).

Figure 8A:
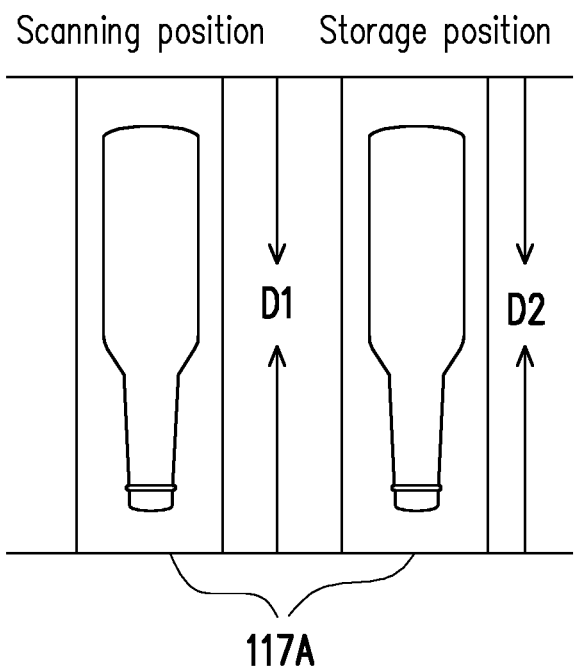
FIGS. 8A to 8B are schematic diagrams of an object supporting member according to two embodiments of the present invention.
Figure 8B:
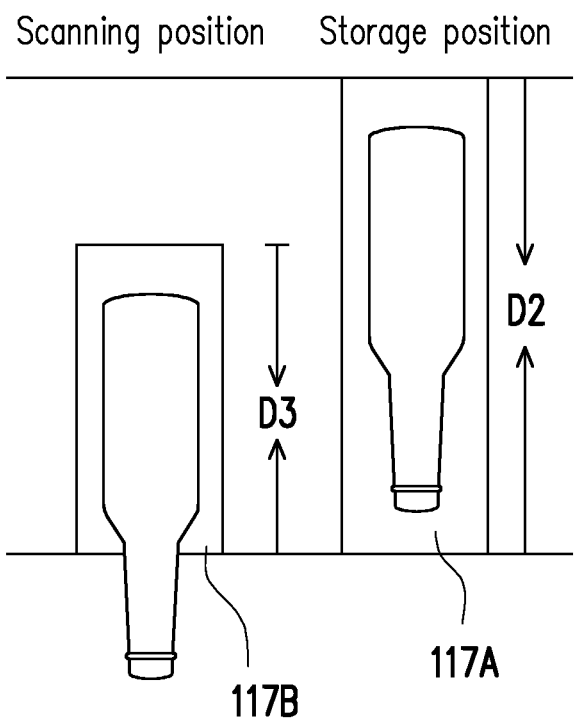

Depending on different design requirements, the design of the storage elements 117 corresponding to the scanning position and the storage position may be the same or similar. FIG. 8A is a schematic diagram of an object supporting member 117 according to one embodiment of the present invention. Referring to FIG. 8A, the depths D1, D2 of the object supporting members 117 corresponding to different positions provided for storing the external objects are the same. Such a design is relatively simple for a manufacturer, but may cause the user to accidentally store the external object in the object supporting member 117 corresponding to the scanning position. FIG. 8B is a schematic diagram of an object supporting member 117 according to another embodiment of the present invention. Referring to FIG. 8B, the object supporting members 117 at two positions provide different depths for storage of the external objects, where a depth D3 provided by the scanning position is smaller than a depth D2 provided by the storage position, so that some of the wine bottles are exposed. Thus, the user can conveniently confirm the current storage position.

In addition, the foregoing vacancy guidance is indicated by illumination. In one embodiment, each storage element 117 is further provided with an object blocking mechanism (e.g., a gate, a switch, or a reset mechanism). The processor 180 may control the object blocking mechanism to block external objects from being placed on or into the corresponding storage elements 117. When the scanning operation is activated and the cabinet door detector 120 detects that the cabinet door 115 is opened, the processor 180 controls one or more object blocking mechanisms to be activated. For example, the processor 180 retains only one object blocking mechanism opened, and the remaining object blocking mechanisms will block storage, thereby allowing the user to only store external objects on or into designated storage elements 117.

It should be noted that the foregoing embodiments of FIGS. 6A and 7A to 8B are used for the object storing apparatuses 100A to 100B having the scanning apparatus 130. For the object storing apparatus 100D (without the scanning apparatus 130), steps such as filling light, two-stage illumination, and scanning operation can be ignored.

Figure 9A:
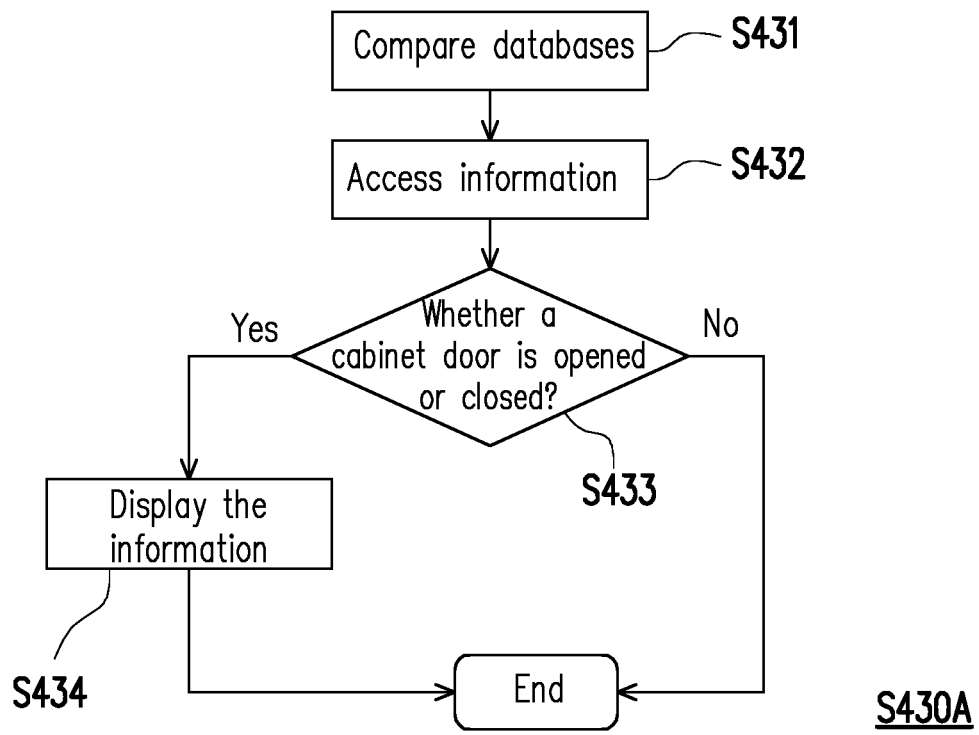
FIGS. 9A to 9B are flowcharts of an object storing service process according to two embodiments of the present invention.

Next, after confirming that the operation of the user is object storing (step S417), the embodiment of the present invention will correspondingly provide an object storing service process (step S430). FIG. 9A is a flowchart of an object storing service process (step S430A) according to one embodiment of the present invention. Referring to FIG. 9A, the object storing apparatus 100A is taken as an example (the object storing apparatus 100B is applicable), and the processor 180 will compare object databases (step S431). The object database may be the storing element 160 recorded on the present apparatus or an external database. The processor 180 then accesses related information about the currently stored external object from the object database (step S432). The information may include original information of an external object, and/or extended information, and inventory information. The original information is only related to the information of the external object itself, that is, information generated by performing a text recognition process or an image recognition process on scanning content acquired by the scanning operation. Wine, for example, is taken as an external object, and the original information may be name, capacity, serving size, wine name, product name, wine merchant name, importer, winery name, manufacturer, alcohol content, nutrient content ratio, country of origin, production area, grade, vintage, date of manufacture, vineyard location, production trace, bottling location, and/or manufacturing address. The extended information is related to information additionally given to an external object (i.e., not the original information of the object itself), that is, information generated after an external database or the storing element 160 is searched according to the original information and a search result is associated. Wine is taken as an example, the extended information includes taste descriptions, user experiences, introduction videos, stories, cooking methods, usage patterns, consumer evaluations, meal styles, spot prices, and/or historical prices. In addition, the inventory information is about a storage situation of an external object, that is, information generated by checking the external objects currently stored on the storage element 117 recorded by the storing element 160 according to the original information. For example, the inventory information includes local inventory quantity, remote inventory quantity, local storage position, remote storage position, purchase price, purchase time, deposit time, obtaining time, and/or last obtaining time.

It should be noted that the information may be acquired through a scanning operation, an existing storage, or a connection to the Internet. The embodiment of the present invention is not limited.

Next, the processor 180 determines, through the cabinet door detector 120, whether the cabinet door 115 is closed (step S433). If the cabinet door 115 is closed, the processor 180 may display information (i.e., at least one of the foregoing three kinds of information) through a display 150 (step S434).

Figure 9B:
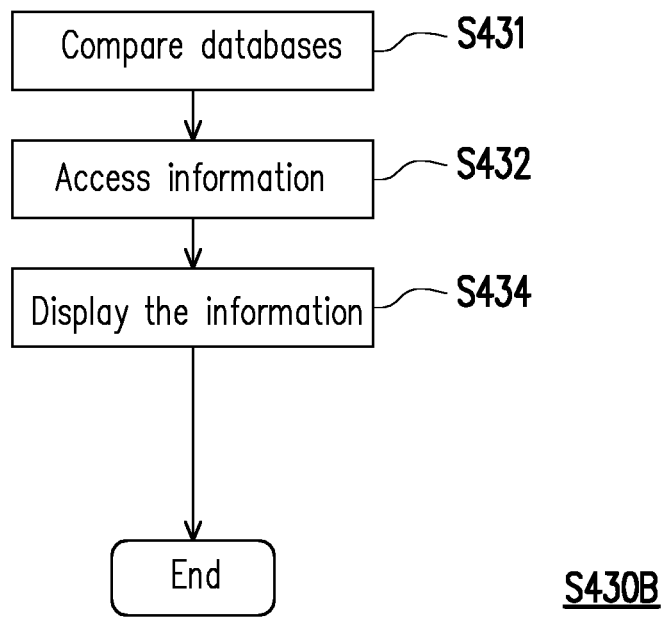

For the object storing apparatus 100C, 100D without the cabinet door 115, FIG. 9B is a flowchart of an object storing service process (step S430B) according to another embodiment of the present invention. Referring to FIG. 9B, the difference from the embodiment of FIG. 9A is that step S433 of determining that the cabinet door 115 is closed is omitted, and after obtaining information, the processor 180 displays the acquired information (step S434).

Figure 10A:
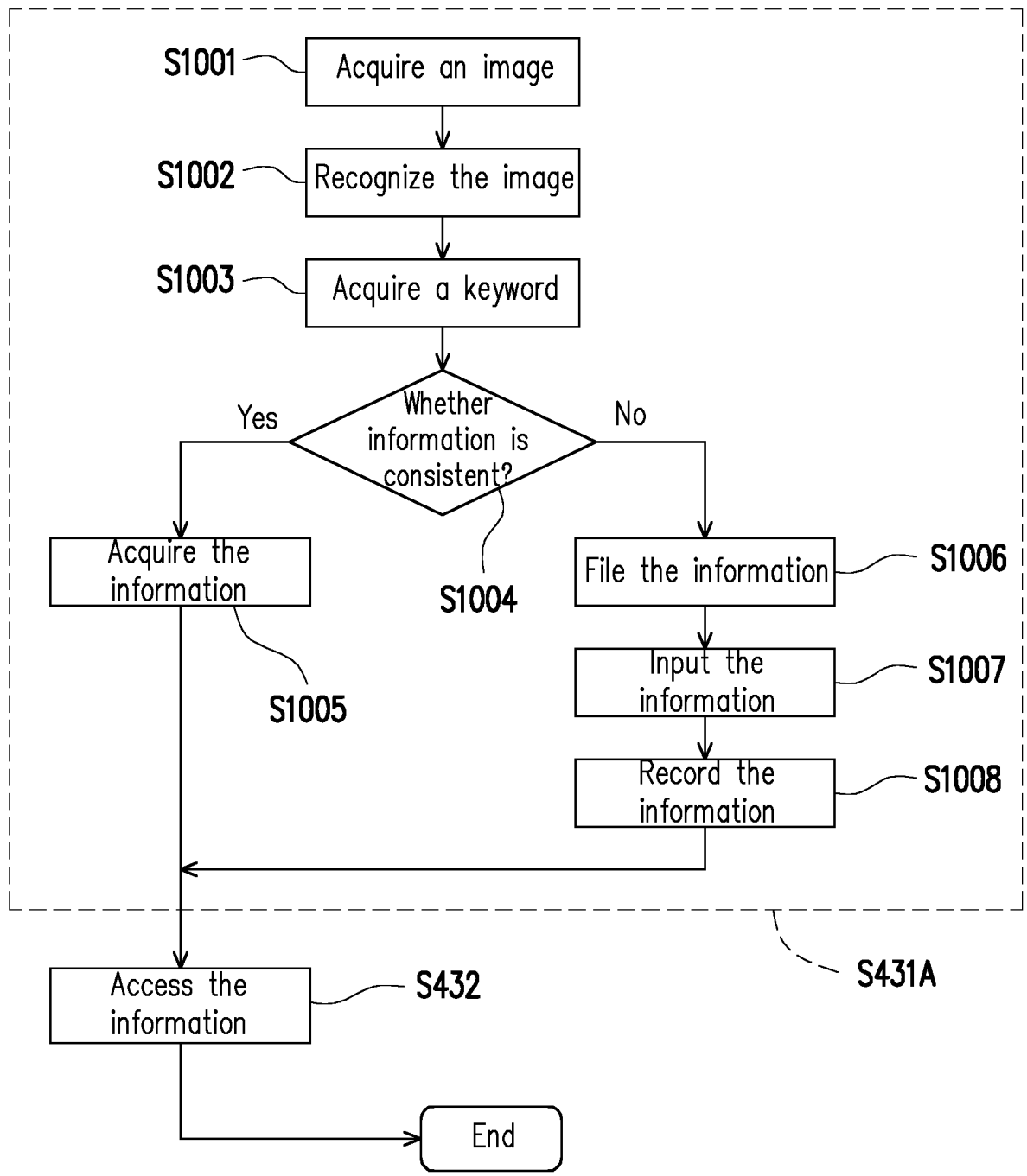
FIGS. 10A to 10C are flowcharts of information comparison according to three embodiments of the present invention.

It should be noted that the foregoing original information may be generated, manually filed, or retrieved from an object database based on the scanning content (e.g., image, or graphics) acquired by the scanning operation. There are many variations in image recognition and filing. FIG. 10A is a flowchart of information comparison according to one embodiment of the present invention. Referring to FIG. 10A, in the comparison of the object database (step S431A), the processor 180 acquires an image for an external object from the scanning apparatus 130 (step S1001), captures and recognizes the text in the image (step S1002) (that is, text recognition), and extracts keywords/sentences (which may be object name, vintage, place of manufacture, brand, etc.) to be compared from the text (step S1003). Next, the processor 180 compares whether there is a word/sentence matching object in the foregoing object database based on the keywords (step S1004). If there is a match, the processor 180 acquires the matched original information and extended information from the object database (step S1005). If not, the processor 180 may present a manual filing interface through the display 150 (step S1006), acquire original data and/or extended information input by the user through the input apparatus 170 (step S1007), and then record the input information into the object database (step S1008). Next, the processor 180 may further access the corresponding keyword/sentence information, or the manual filing information recorded in an inventory database (step S432). It should be noted that the information recorded in the inventory database corresponds to the external objects currently stored in the object storing apparatuses 100 to 100D, and the corresponding information may be deleted due to the obtaining of the external objects or there are other adjustment modes.

Figure 10B:
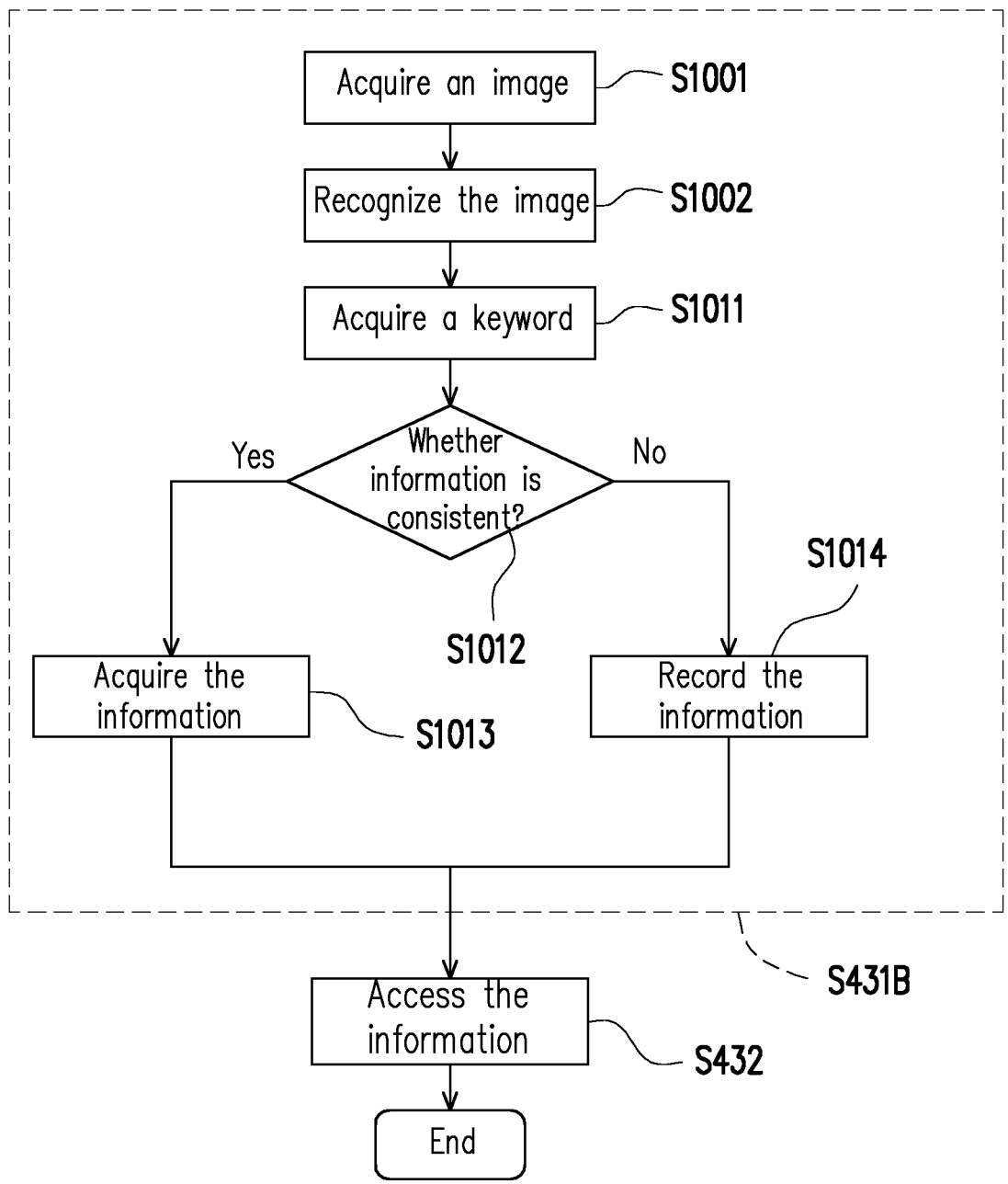

FIG. 10B is a flowchart of information comparison according to another embodiment of the present invention. Referring to FIG. 10B, the difference from the embodiment of FIG. 10A is that, in the comparison of the object database (step S431B), the processor 180 directly acquires/generates original data based on all the recognized texts/patterns (step S1011) (i.e., image recognition processing), and determines whether there is an object matching the original information in the object database (step S1012). If there is a match, the processor 180 acquires extended information corresponding to the original information (step S1013). If not, the processor 180 stores the original information (step S1014).

Figure 10C:
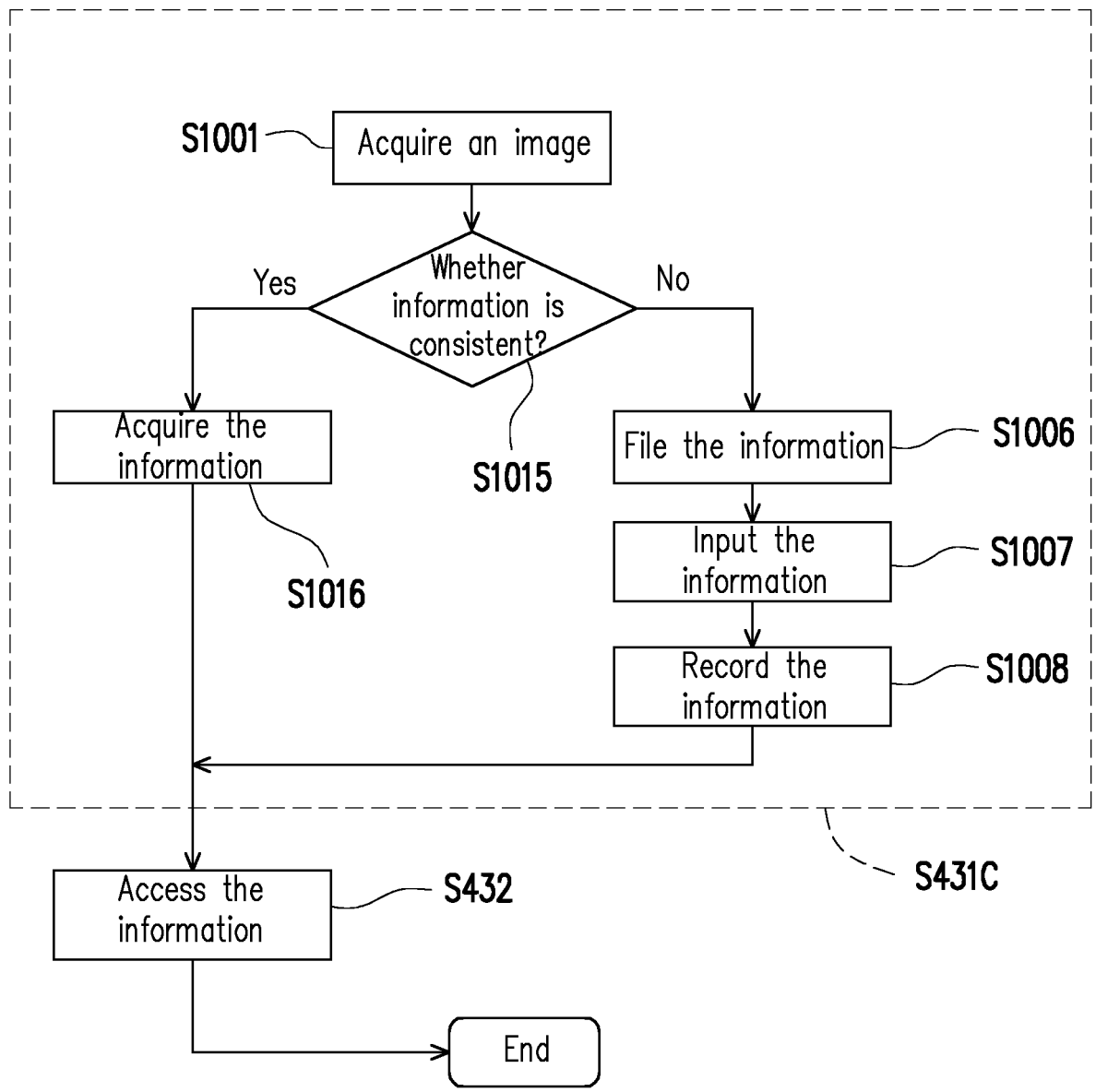

FIG. 10C is a flowchart of information comparison according to another embodiment of the present invention. Referring to FIG. 10C, the difference from the embodiment of FIG. 10A is that, in the comparison of the object database (step S431C), the processor 180 directly compares the object database based on an image acquired by the scanning apparatus 130 (step S1015). If there is a match, the processor 180 acquires original information and extended information corresponding to the image (step S1016).

On the other hand, for the object obtaining service process (step S450), it is considered that some of the external objects may be consumables (e.g., food) in the embodiments of the present invention, and thus additionally provide ordering services to facilitate restocking by the user.

Figure 11A:
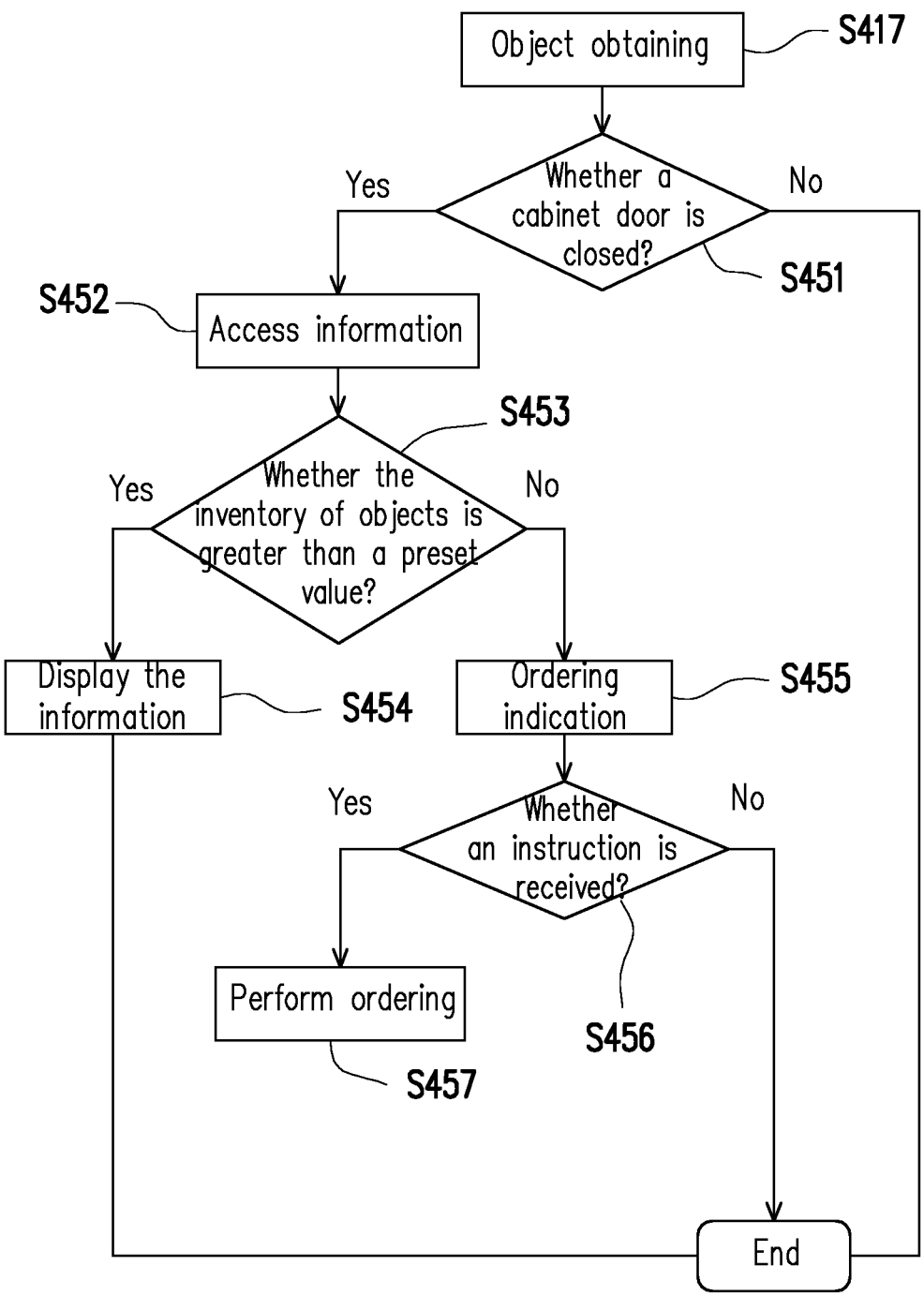
FIGS. 11A to 11E are flowcharts of an object obtaining service process according to five embodiments of the present invention.

FIG. 11A is a flowchart of an object obtaining service process according to one embodiment of the present invention. Referring to FIG. 11A, the object storing apparatus 100A is taken as an example (the object storing apparatus 100B is applicable), in the object obtaining service process (step S450A), after confirming that the operation of the user is object obtaining (step S417), the processor 180 determines, through the cabinet door detector 120, whether the cabinet door is closed (step S451). If the cabinet door is closed (step S451), the processor 180 acquires original information and/or extended information of an accessed external object (step S452). The processor 180 then determines whether the inventory of the external objects of the same item in the cabinet body 110 or the inventory of all items is greater than a preset value (step S453). If the inventory is still greater than the preset value, the processor 180 may display related information of the obtained external object through the display element 150 (step S454). If the inventory is not greater than the preset value, the processor 180 displays an ordering indication notification through the display element 150 (step S455), and confirms whether an ordering instruction is received through the input apparatus 170 (step S456). If the ordering instruction is received, an ordering process (for example, online purchase, ordering mail sending, etc.) is entered (step S457).

Figure 11B:
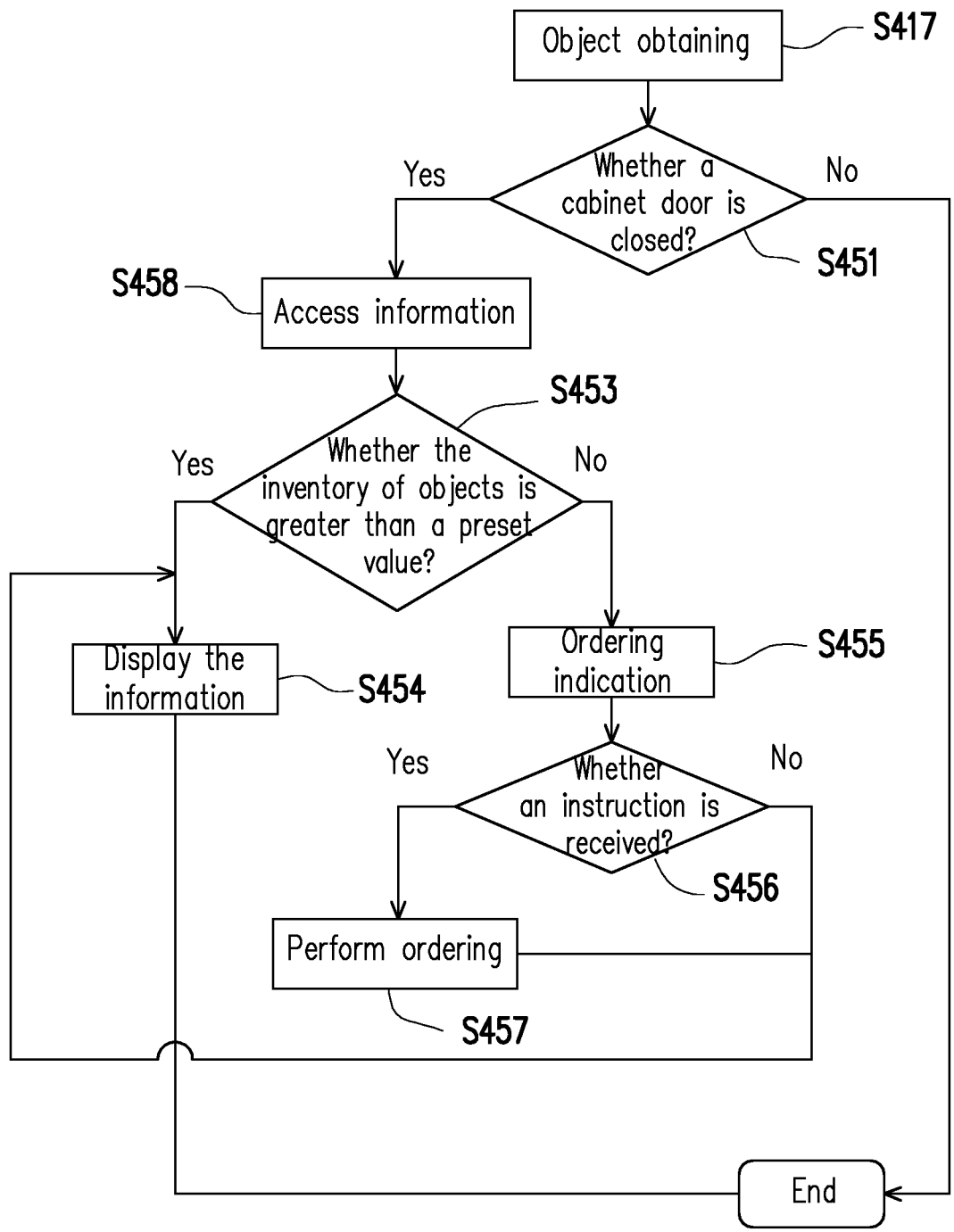

FIG. 11B is a flowchart of an object obtaining service process according to another embodiment of the present invention. Referring to FIG. 11B, the difference from FIG. 11A is that, in the object obtaining service process (step S450B), in response to the cabinet door 115 being closed, the processor 180 may acquire original information, extended information, and/or inventory information (step S458). In addition, after the ordering process (step S457), the processor 180 may display related information of the obtained external object through the display element 150 (step S454).

Figure 11C:
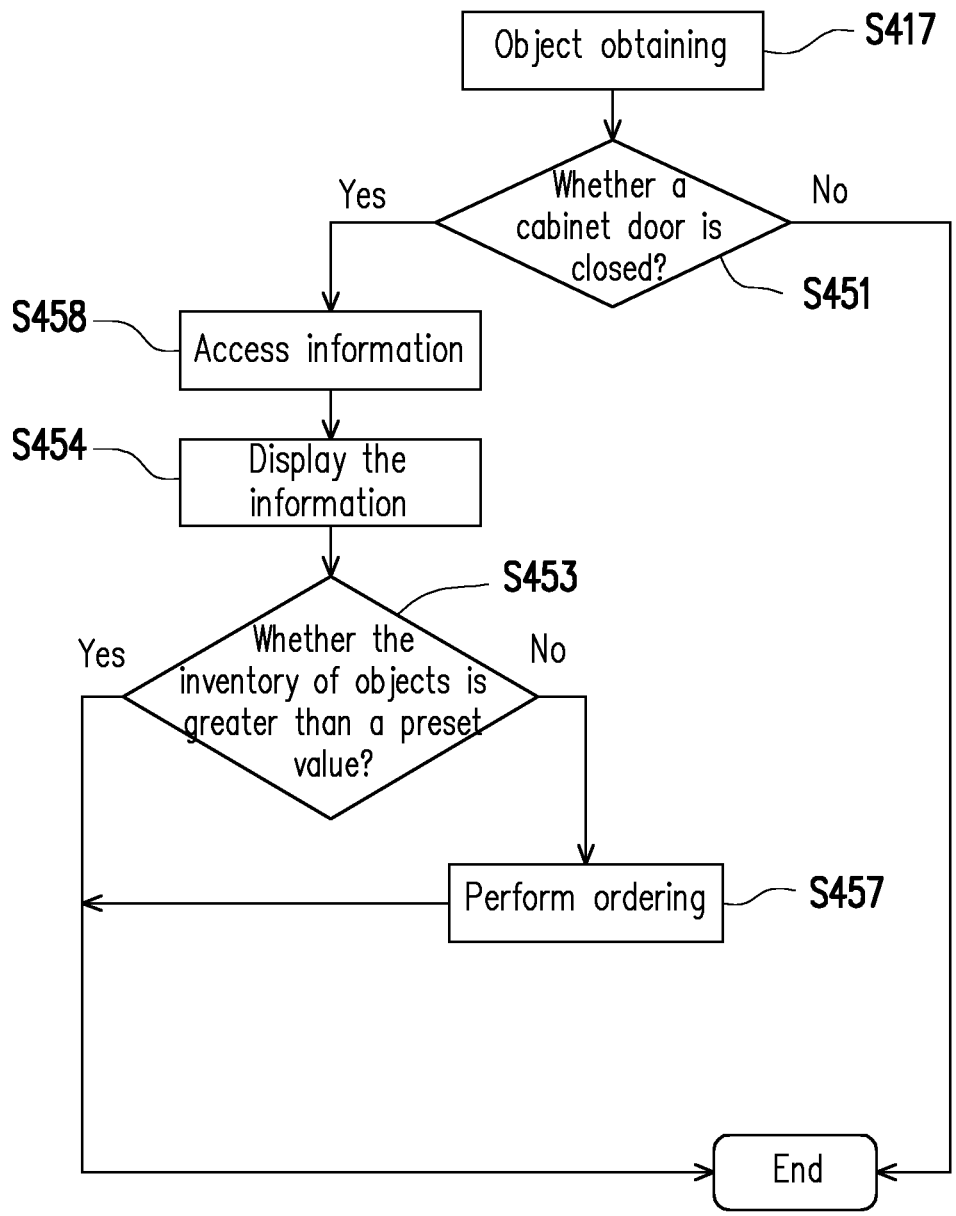

FIG. 11C is a flowchart of an object obtaining service process according to yet another embodiment of the present invention. Referring to FIG. 11C, the difference from FIG. 11A and FIG. 11B is that, in the object obtaining service process (step S450C), the display element 150 first displays the object related information (step S454), and the processor 180 determines the inventory (step S453) and accordingly performs direct ordering (step S457).

Figure 11D:
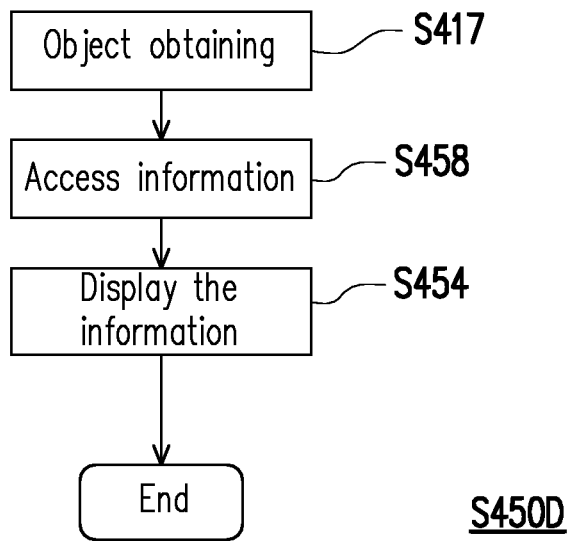

For the object storing apparatus 100C, 100D without the cabinet door 115, FIG. 11D is a flowchart of an object obtaining service process according to another embodiment of the present invention. Referring to FIG. 11D, the difference from FIGS. 11A to 11C is that, in the object obtaining service process (step S450D), the step of determining whether the cabinet door is closed (step S451) and the step of determining the inventory (step S453) may be omitted, and the related information of the obtained external object is only displayed (step S454).

Figure 11E:
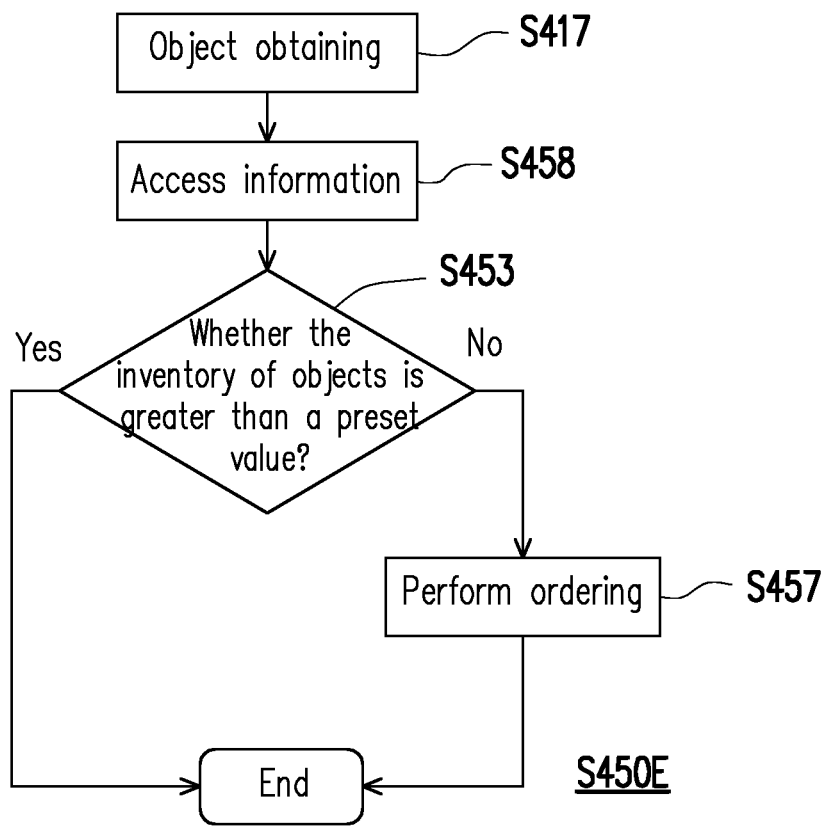

FIG. 11E is a flowchart of an object obtaining service process according to yet another embodiment of the present invention. Referring to FIG. 11E, the difference from FIG. 11D is that, in the object obtaining service process (step S450E), the inventory determining process (step S453) and the ordering process (step S457) are retained.

It should be noted that the foregoing ordering process (step S457) may provide an ordering service of the same item, the recommended vintage or the popular item according to the information of the obtained external object. In one embodiment, the processor 180 may provide the ordering service of a recommended vintage according to purchase time or deposit time and last obtaining time of inventory information of the external object.

For example, the processor 180 accesses information about the currently or previously obtained external objects (e.g., original information, extended information, and/or inventory information), and calculates, checks, and analyzes user preference information. The preference information, which is related to wine for example, may be a preference country of origin, a preference name, a preference for alcohol, a preferred year, a preferred capacity, a preference grape variety, a preferred price, and/or a last year of obtaining of the previously obtained object. The processor 180 then calculates a recommended vintage according to the preference vintage and the last year of obtaining of the previously obtained object. For example, the recommended vintage (2002) is the difference between this year (2019) minus the last year of obtaining of the previously obtained object and the preference vintage (2016-2000). The resulting recommended vintage can be used as a reference for objects recommended in the ordering service.

In another embodiment, the processor 180 provides the ordering service of a popular item according to extended information of the external object. For example, consumer evaluations or related items in the extended information are used to acquire the top three items of domestic and international sales, the recommended items of the winery, and the recommended items of the taster, as reference basis for the recommended objects in the ordering service.

It should be noted that there are many ways to acquire recommended objects in the purchase service, and depending on different types and content of the external objects, the application user may self-adjust the decision mode of the recommended objects as required.

Figure 12A:
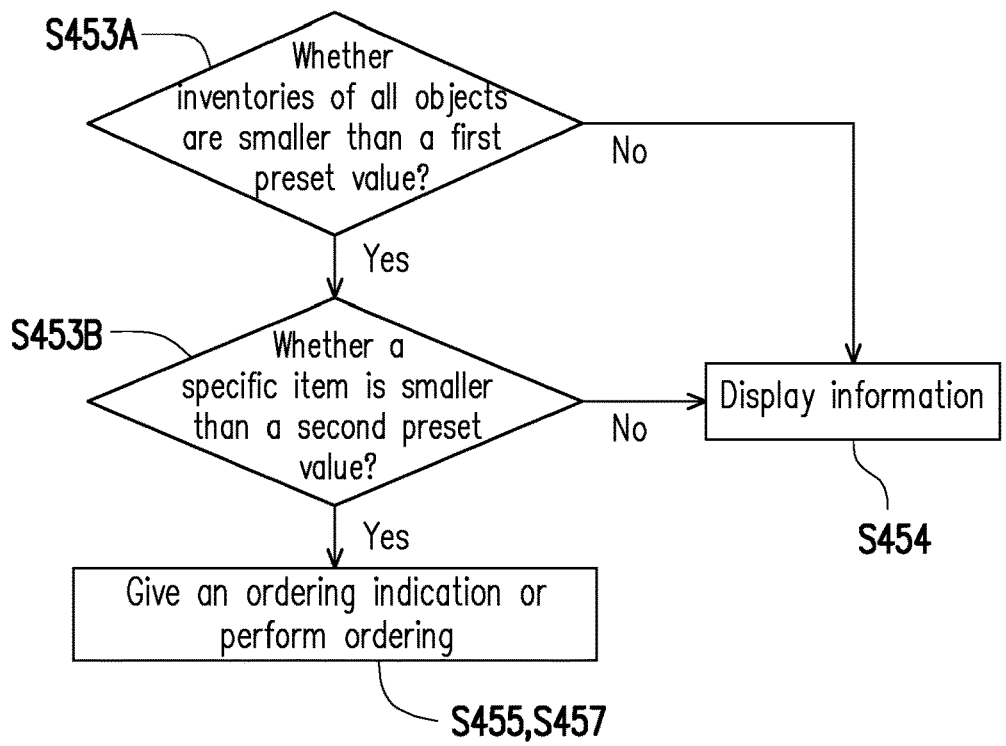
FIGS. 12A to 12B are flowcharts of an object obtaining service process according to two embodiments of the present invention.

It is also worth noting that the user may only obtain an object at a time. FIG. 12A is a flowchart of an object obtaining service process according to one embodiment of the present invention. Referring to FIG. 12A, in the foregoing inventory determining process (step S453), the processor 180 may first determine whether the inventory of all objects is smaller than a first threshold (step S453A). If it is smaller than the first threshold, the processor 180 further determines whether the inventory of the currently obtained external objects of the same item (i.e., a specific item) is smaller than a second threshold value (step S453B). After it is not smaller than the threshold value by second confirmation, the processor 180 provides an ordering indication (step S455) or directly orders (step S457).

Figure 12B:
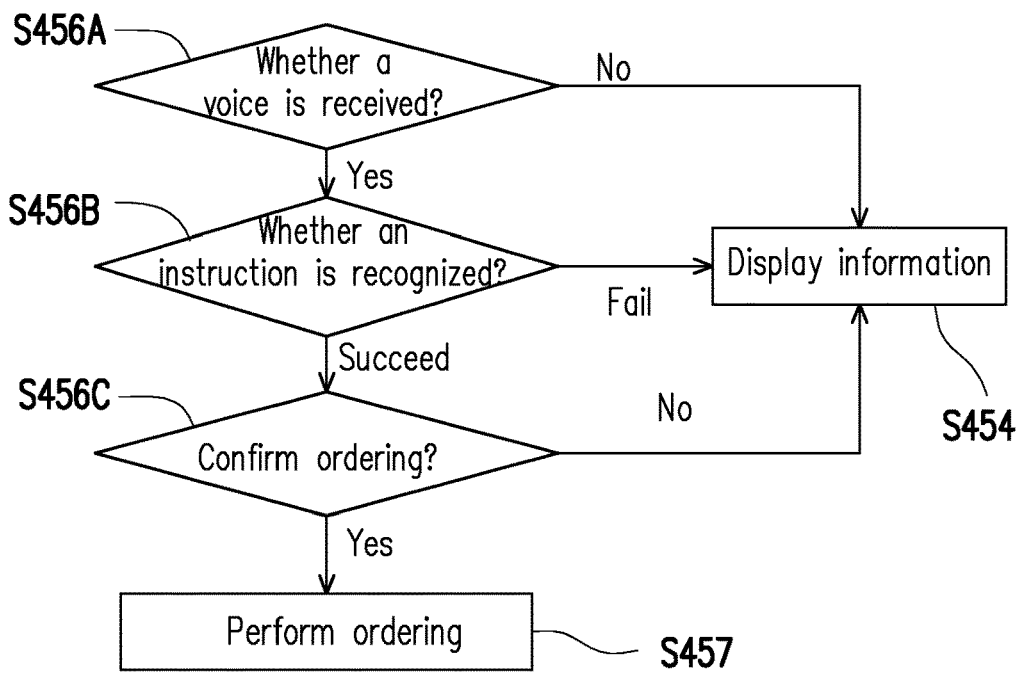

Further, in the embodiment of FIG. 11A, it is necessary to confirm instruction receiving (step S456). FIG. 12B is a flowchart of an object obtaining service process according to another embodiment of the present invention. Referring to FIG. 12B, assuming that the input apparatus 130 is a microphone, the processor 180 first confirms whether a voice is received within a specific time (for example, 3 or 2 seconds) (step S456A). If a voice is received, the processor 180 may recognize the instruction based on the voice content (step S456B). If the voice instruction can be successfully recognized, the processor 180 determines whether the voice instruction is to perform ordering (step S459). If it is confirmed that ordering is to be performed, ordering is performed (step S457).

It should be noted that the embodiment of the present invention is not limited to voice-activated ordering, and may also acquire the intention of the user by an input apparatus such as a touch element, a keyboard, or a button. In addition, the content such as contact information acquisition, payment mechanism, and list confirmation in a shopping service can be added to the foregoing embodiments of FIGS. 11A to 12B according to actual needs.

In addition to the foregoing object storing and obtaining services, the embodiments of the present invention have other functions to facilitate the user to know and understand the stored contents when the cabinet door 115 is closed. In the present embodiment, the input apparatus 170 of the object storing apparatus 100 is a touch element, and the touch element is disposed on the cabinet door 115 and overlaps with a panel of the transparent adjustable display element 150. The touch element may generate a touch position in response to the contact of external objects, and the processor 180 indicates, according to the touch position detected by the touch element, an object on the corresponding storing position (may or may not exist).

In one embodiment, the processor 180 may control, according to the touch position, the object illumination apparatus 131 corresponding to the storage position to provide illumination, and the transparency of the display element 150 is higher than a threshold or 100%. Thus, the user can directly check whether an object is stored at the corresponding storage position.

Figure 13:
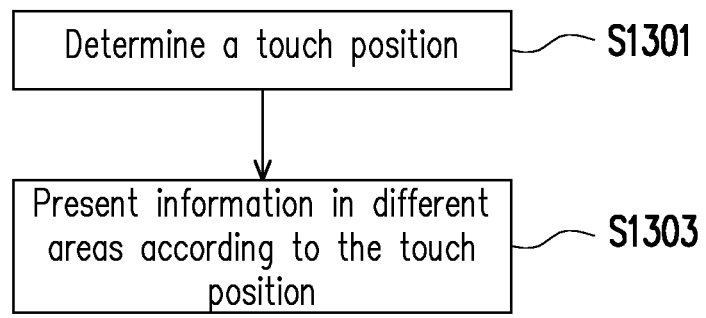
FIG. 13 is a flowchart of an object indication method according to one embodiment of the present invention.

In another embodiment, FIG. 13 is a flowchart of an object indication method according to one embodiment of the present invention. Referring to FIG. 13, the processor 180 first determines the touch position (step S1301). Next, the processor 180 may present, according to the touch position, related information corresponding to the storing position or the external object (for example, an external object or the storage element 117 for placing the external object) in an area on the display element 150 different from the touch position (step S1303). Since the display element 150 overlaps with the panel of the touch element, display information needs to be presented in an area of a non-touch position, so that the user can conveniently read the information content. The processor 180 may divide the display area on the display element 150 into at least two areas in advance, determine an area corresponding to the touch position, and present an image in different areas. In addition, the processor 180 determines whether to switch the area for displaying information in response to the change of the touch position. If the touch position is still different from the area where the information is currently displayed, the same area can be maintained. The touch position is the same as the area where the information is currently displayed, and the processor 180 will switch to other areas to display the information.

If the touch element does not detect the touch position, the processor 180 stops indicating the object. For example, the display element 150 stops displaying the information or the object illumination apparatus 131 stops providing illumination.

Figure 14A:
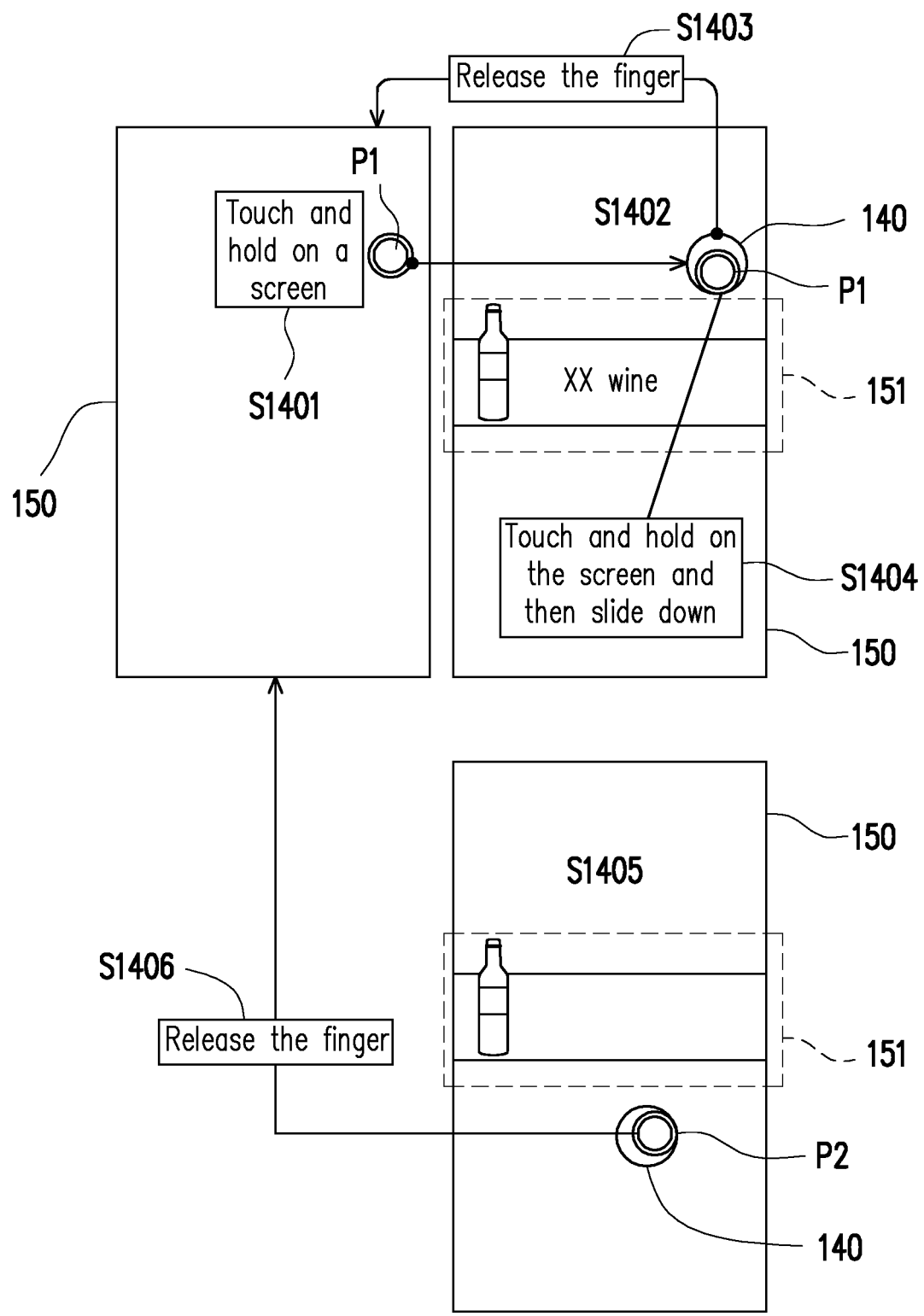
FIGS. 14A to 14D are four examples illustrating object indication.

FIGS. 14A to 14D are four examples illustrating object indication. Referring to FIG. 14A first, the user touches and holds the touch element with a finger (step S1401) to detect the touch position P1. The indication illumination apparatus 140 corresponding to the touch position P1 is to be illuminated, and the display element 150 presents related information 151 of an object on the corresponding storage element 117 (step S1402). If the finger is released and leaves the touch element (step S1403), the indication illumination apparatus 140 turns dark, and the display element 150 no longer displays the information 151. If the finger still touches and holds on the screen and slides down to a touch position P2 shown in the figure below, since the display area of the information 151 and the touch position P2 do not overlap, the information 151 is still displayed in the same area (step S1405). Similarly, if the finger is released and leaves the touch element (step S1406), the indication illumination apparatus 140 turns dark, and the display element 150 no longer displays the information 151.

Figure 14B:
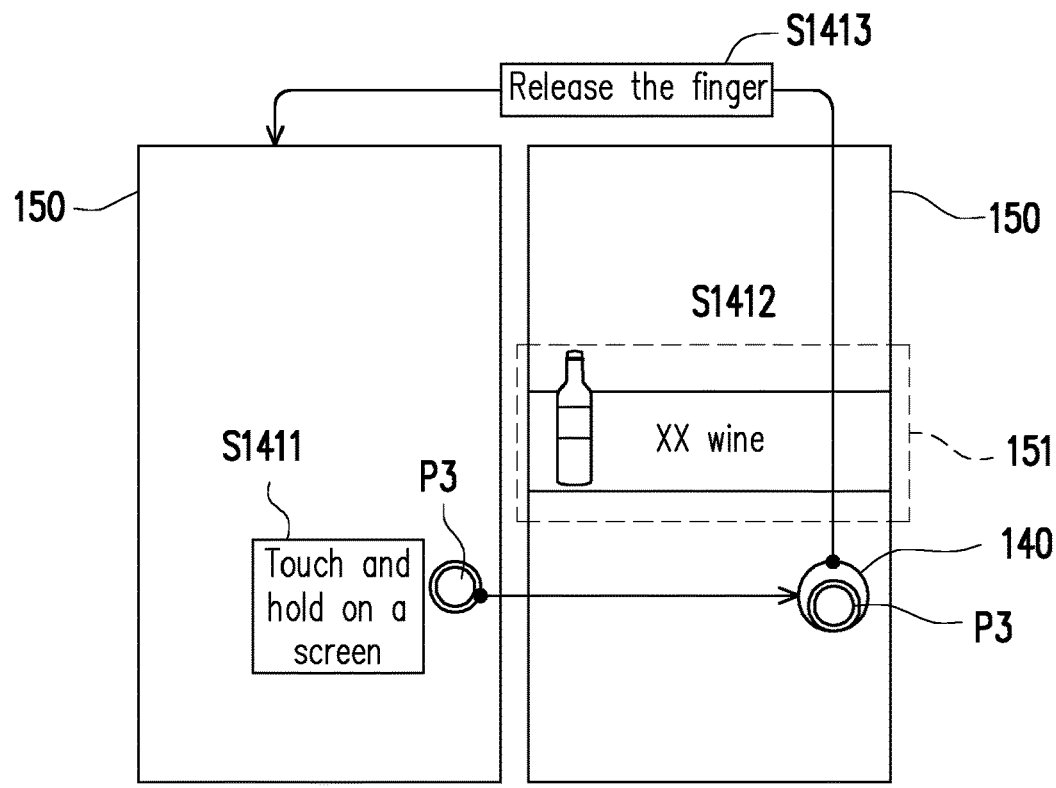

Referring to FIG. 14B, if the finger of the user touches and holds at a touch position P3 (step S1411), the indication illumination apparatus 140 corresponding to the storage position provides illumination, and the display element 150 presents the information 151 (step S1412). When the finger is released (step S1413), information will no longer be indicated and illumination will no longer be provided.

Figure 14C:
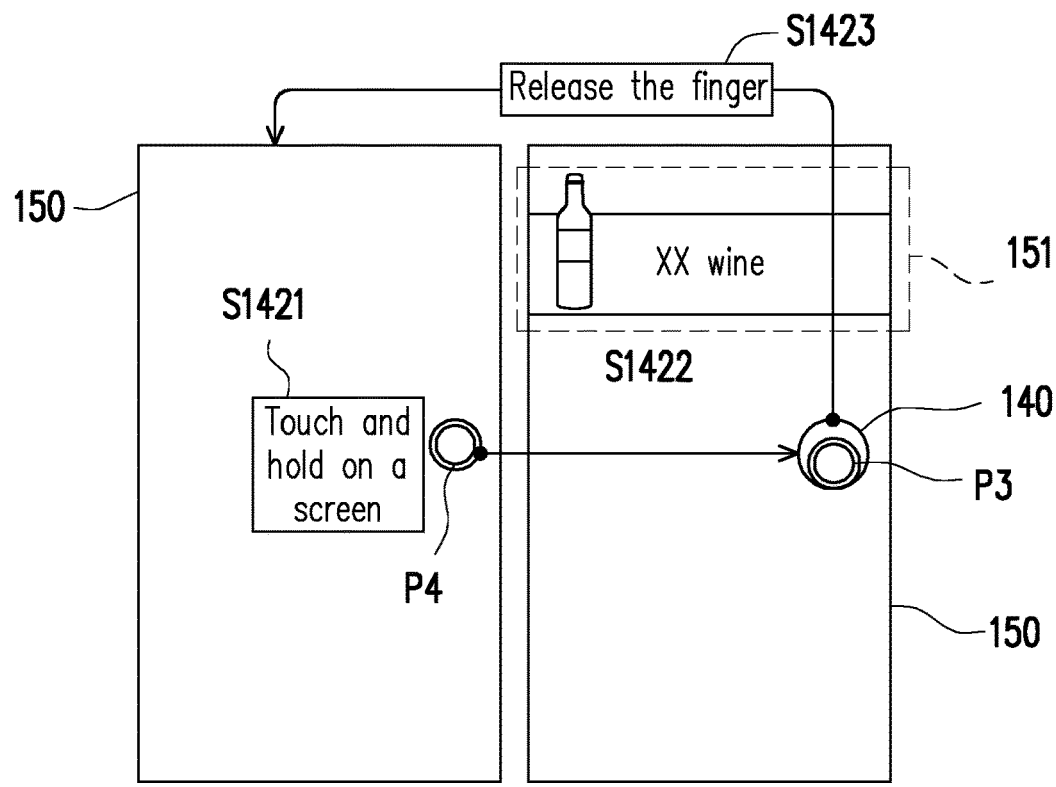
Figure 14D:
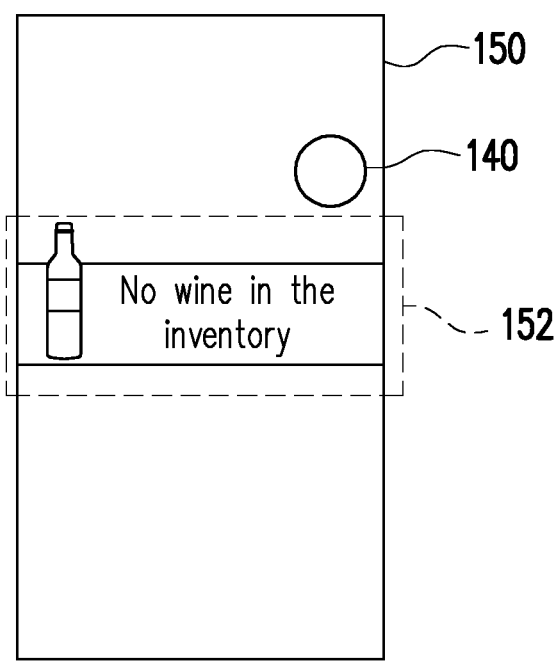

Referring to FIG. 14C, if the finger of the user touches and holds at a touch position P4 (step S1421), the indication illumination apparatus 140 corresponding to the storage position provides illumination, and the display element 150 presents the information 151 (step S1422). The difference from FIG. 14B is that the information 151 presentation area will change. When the finger is released (step S1423), information will no longer be indicated and illumination will no longer be provided.

Referring to FIG. 14C, if the touch position does not have an object corresponding to the storage position, the indication illumination apparatus 140 can still provide illumination, and information 152 presented by the display element 150 will be related to no object storage.

In summary, the management of goods has always been a topic that cannot be ignored in life. However, with the introduction of new technologies, sometimes users must re-learn a new set of interactive modes to make users more at a loss. In order to improve these problems, the embodiments of the present invention make the use process as close as possible to an original interaction mode of users, add intelligent detection and determination, directly provide the users with corresponding services, and allow the help of the technology to meet the needs of the users, instead of forcing the users to learn or change their lifestyles in order to get the benefits of the technology.

The embodiments of the present invention can allow the user to tell a currently required service to a system through a human-machine interface before storing or obtaining objects, but to determine whether the object storing apparatus needs to provide a service of "object storing" or "object obtaining" currently by detecting actions of the user after opening the door.

A user opens the cabinet door and obtains an object directly from the cabinet. The object storing apparatus uses a sensor to detect that there is an object left from the cabinet body, so "object obtaining" is determined, and an object obtaining service is provided.

A user opens the cabinet door and uses the scanning apparatus in the cabinet body to read object information. At this time, the processor detects that the scanning apparatus in the cabinet is activated, so "object storing" is determined, and an object storing service is provided.

The system determination process has certain flexibility. When the object storing apparatus determines "object obtaining" or "object storing", the object storing apparatus will continue to detect the use process of the user. If there is any inconsistent behavior, the object storing apparatus will actively notify the user and ask the user to respond or give feedback.

Although the present invention has been disclosed with the foregoing embodiments, it is not intended to limit the present invention, and it is possible for any person of ordinary skill in the art to make some modifications and refinements without departing from the spirit and scope of the present invention. Therefore, the scope of protection of the present invention should be defined by the scope of the appended claims.

What is claimed is:

1. An object storing apparatus, comprising:
   a cabinet body, comprising an internal space;
   a cabinet door, movably disposed on the cabinet body, and adapted to open or close the internal space;
   a plurality of storage elements, disposed in the internal space, and adapted to store at least one external object;
   a scanning apparatus, disposed in the internal space, and adapted to scan the at least one external object;
   a cabinet door detector, detecting whether the cabinet door is opened or closed;
   a processor, coupled to the scanning apparatus and the cabinet door detector, and adapted to control the scanning apparatus to activate a scanning operation according to a detection result of the cabinet door detector; and
   a plurality of object blocking mechanisms, coupled to the processor, respectively disposed on the corresponding storage elements, and adapted to block the at least one external object from being placed on or into the corresponding storage element,
   wherein when the scanning operation is activated and the cabinet door detector detects that the cabinet door is opened, the processor controls at least one object blocking mechanism to be opened for correspondingly placing the at least one external object on or into the at least one storage element.

2. The object storing apparatus according to claim 1, further comprising:
   a scanning illumination apparatus, coupled to the processor, disposed in the internal space, and adapted to illuminate a scanning area of the scanning apparatus.

3. The object storing apparatus according to claim 2, wherein when the cabinet door detector detects that the cabinet door is opened, the processor controls the scanning illumination apparatus to illuminate the scanning area of the scanning apparatus with a first brightness.

4. The object storing apparatus according to claim 3, further comprising:
   a scanned object detector, coupled to the processor, disposed in the internal space, and adapted to detect the at least one external object.

5. The object storing apparatus according to claim 4, wherein when the scanned object detector detects the at least one external object, the processor controls the scanning illumination apparatus to illuminate the scanning area of the scanning apparatus with a second brightness.

6. The object storing apparatus according to claim 5, wherein the second brightness is greater than the first brightness.

7. The object storing apparatus according to claim 5, wherein when the scanning illumination apparatus provides illumination of the second brightness, the processor controls the scanning apparatus to activate the scanning operation.

8. The object storing apparatus according to claim 1, further comprising:
   a plurality of stored object detectors, coupled to the processor, disposed in the internal space in respective correspondence with the storage elements, and adapted to detect whether the at least one external object is stored by the corresponding storage element.

9. The object storing apparatus according to claim 8, further comprising:
   a plurality of indication illumination apparatuses, coupled to the processor, and disposed in the internal space in respective correspondence with the storage elements.

10. The object storing apparatus according to claim 9, wherein when the scanning operation is activated and the stored object detectors do not detect the at least one external object, the processor controls at least one of the corresponding indication illumination apparatuses to provide illumination.

11. The object storing apparatus according to claim 1, further comprising:
   a touch element, coupled to the processor, disposed on the cabinet door, and adapted to generate a touch position; and
   a display element, coupled to the processor, disposed on the cabinet door, and adapted to generate a display area, to present an image on the cabinet door.

12. The object storing apparatus according to claim 11, wherein the touch position and the display area do not overlap.

13. The object storing apparatus according to claim 12, wherein the touch position corresponds to one of the at least one storage element or the at least one external object.

14. The object storing apparatus according to claim 13, wherein information corresponding to one of the at least one storage element or the at least one external object is displayed on the display area.

15. The object storing apparatus according to claim 1, further comprising:
a storing element, recording at least one of original information, extended information, and inventory information of the at least one external object.

16. An object storing apparatus, comprising:
a cabinet body, comprising an internal space;
a cabinet door, movably disposed on the cabinet body, and adapted to open or close the internal space;
a plurality of storage elements, disposed in the internal space, and adapted to store at least one external object;
a scanning apparatus, disposed in the internal space, and adapted to scan the at least one external object;
a cabinet door detector, detecting whether the cabinet door is opened or closed;
a processor, coupled to the scanning apparatus and the cabinet door detector, and adapted to control the scanning apparatus to activate a scanning operation according to a detection result of the cabinet door detector;
a scanning illumination apparatus, coupled to the processor, disposed in the internal space, and adapted to illuminate a scanning area of the scanning apparatus; and
a scanned object detector, coupled to the processor, disposed in the internal space, and adapted to detect the at least one external object,
wherein when the cabinet door detector detects that the cabinet door is opened, the processor controls the scanning illumination apparatus to illuminate the scanning area of the scanning apparatus with a first brightness,
wherein when the scanned object detector detects the at least one external object, the processor controls the scanning illumination apparatus to illuminate the scanning area of the scanning apparatus with a second brightness.

17. An object storing apparatus, comprising:
a cabinet body, comprising an internal space;
a cabinet door, movably disposed on the cabinet body, and adapted to open or close the internal space;
a plurality of storage elements, disposed in the internal space, and adapted to store at least one external object;
a scanning apparatus, disposed in the internal space, and adapted to scan the at least one external object;
a cabinet door detector, detecting whether the cabinet door is opened or closed;
a processor, coupled to the scanning apparatus and the cabinet door detector, and adapted to control the scanning apparatus to activate a scanning operation according to a detection result of the cabinet door detector;
a plurality of stored object detectors, coupled to the processor, disposed in the internal space in respective correspondence with the storage elements, and adapted to detect whether the at least one external object is stored by the corresponding storage element; and
a plurality of indication illumination apparatuses, coupled to the processor, and disposed in the internal space in respective correspondence with the storage elements.

18. An object storing apparatus, comprising:
a cabinet body, comprising an internal space;
a cabinet door, movably disposed on the cabinet body, and adapted to open or close the internal space;
a plurality of storage elements, disposed in the internal space, and adapted to store at least one external object;
a scanning apparatus, disposed in the internal space, and adapted to scan the at least one external object;
a cabinet door detector, detecting whether the cabinet door is opened or closed;
a processor, coupled to the scanning apparatus and the cabinet door detector, and adapted to control the scanning apparatus to activate a scanning operation according to a detection result of the cabinet door detector;
a touch element, coupled to the processor, disposed on the cabinet door, and adapted to generate a touch position; and
a display element, coupled to the processor, disposed on the cabinet door, and adapted to generate a display area, to present an image on the cabinet door,
wherein the touch position and the display area do not overlap,
wherein the touch position corresponds to one of the at least one storage element or the at least one external object.

* * * * *